US012708097B2

(12) United States Patent
Baxter et al.

(10) Patent No.: US 12,708,097 B2
(45) **Date of Patent: *Aug. 18, 2026**

(54) AUTOMATED LITTER DEVICE

(71) Applicant: Automated Pet Care Products, LLC, Auburn Hills, MI (US)

(72) Inventors: Brad Baxter, Bloomfield Hills, MI (US); Jason Smith, West Bloomfield, MI (US); Jason Weihman, Auburn Hills, MI (US)

(73) Assignee: AUTOMATED PET CARE PRODUCTS, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,169

(22) Filed: Jun. 24, 2024

(65) Prior Publication Data

US 2024/0341267 A1 Oct. 17, 2024

Related U.S. Application Data

(63) Continuation of application No. 17/977,108, filed on Oct. 31, 2022, now Pat. No. 12,052,973, which is a (Continued)

(51) Int. Cl.
*A01K 1/01* (2006.01)

(52) U.S. Cl.
CPC .................................. *A01K 1/0114* (2013.01)

(58) Field of Classification Search
CPC ........ A01K 1/0114; A01K 1/011; A01K 1/01; A01K 1/0107
See application file for complete search history.

(56) References Cited

U.S. PATENT DOCUMENTS 4,096,827 A 6/1978 Cotter
4,120,264 A 10/1978 Carter
(Continued)

FOREIGN PATENT DOCUMENTS

CA 1198638 A 12/1985
CN 209314546 U 8/2019
(Continued)

OTHER PUBLICATIONS

Notification of Reasons for Refusal dated Mar. 13, 2025, JP Application No. 2024-031171.
(Continued)

*Primary Examiner* — Trinh T Nguyen
(74) *Attorney, Agent, or Firm* — The Dobrusin Law Firm, P.C.; Daniela M. Thompson-Walters

(57) ABSTRACT

An automated litter device having: a base; and a chamber configured for retaining a litter and rotatably supported by the support base, wherein the chamber includes: an entry opening so that an animal can enter and exit the chamber; and a waste opening generally opposing the entry opening configured so that an animal waste passes through the waste opening into the base upon rotation of the chamber; wherein the automated litter device includes one or more of: i) one or more sensors located adjacent to the entry opening which are adapted to sense the presence of the animal within the chamber, the presence of the waste in the base, a level of litter in the chamber, a position of the chamber relative to the base, or any combination thereof; ii) a filtering system configured for reducing, eliminating, and/or preventing, malodors building in the base; and/or iii) a litter dispenser in communication with the chamber to transfer some of the litter to the chamber.

20 Claims, 14 Drawing Sheets

Related U.S. Application Data continuation of application No. 17/605,704, filed as application No. PCT/US2020/029776 on Apr. 24, 2020, now Pat. No. 11,523,586.

(60) Provisional application No. 62/982,865, filed on Feb. 28, 2020, provisional application No. 62/837,965, filed on Apr. 24, 2019.

(56) References Cited

U.S. PATENT DOCUMENTS

| | | | |
|---|---|---|---|
| 4,886,014 | A | 12/1989 | Sheriff |
| 5,048,464 | A | 9/1991 | Shirley |
| 5,107,797 | A | 4/1992 | LaRoche |
| 5,458,090 | A | 10/1995 | Favreau |
| 5,477,812 | A | 12/1995 | Walters |
| 5,509,379 | A | 4/1996 | Hoeschen |
| 5,551,375 | A | 9/1996 | Flores |
| 5,622,140 | A | 4/1997 | McIlnay-Moe |
| 5,662,066 | A | 9/1997 | Reitz |
| 5,752,465 | A | 5/1998 | Page |
| 5,931,119 | A | 8/1999 | Nissim |
| 6,055,935 | A | 5/2000 | Engel |
| 6,082,302 | A | 7/2000 | Thaler et al. |
| 6,126,015 | A | 10/2000 | Haymaker |
| 6,463,881 | B2 | 10/2002 | Reitz |
| 6,851,386 | B2 | 2/2005 | Northrop et al. |
| 7,017,519 | B1 | 3/2006 | Deasy |
| 7,137,355 | B1 | 11/2006 | Wan |
| 7,198,006 | B2 | 4/2007 | Fischer |
| 7,278,372 | B2 | 10/2007 | Colsky |
| 7,487,742 | B2 | 2/2009 | Waters |
| 7,647,889 | B2 | 1/2010 | Horanoff |
| 7,762,231 | B2 | 7/2010 | Dugas et al. |
| 7,798,101 | B2 | 9/2010 | Waters |
| 8,413,608 | B2 | 4/2013 | Sharp et al. |
| 8,475,367 | B1 | 7/2013 | Yuen et al. |
| 8,485,131 | B2 | 7/2013 | Veness |
| 8,544,418 | B2 | 10/2013 | Jiang et al. |
| 8,757,094 | B2 | 6/2014 | Baxter |
| 9,433,185 | B2 | 9/2016 | Baxter |
| 9,504,228 | B1 | 11/2016 | Egor et al. |
| 9,565,830 | B1 | 2/2017 | Caico |
| 2002/0139312 | A1 | 10/2002 | Reitz |
| 2007/0056521 | A1 | 3/2007 | Caputa et al. |
| 2007/0227457 | A1 | 10/2007 | Waters |
| 2012/0012063 | A1 | 1/2012 | Smith et al. |
| 2013/0206075 | A1 | 8/2013 | Huck |
| 2013/0213310 | A1 | 8/2013 | Ramisch |
| 2013/0333625 | A1 | 12/2013 | Baxter |
| 2014/0060441 | A1 | 3/2014 | Baxter |
| 2019/0364840 | A1 | 12/2019 | Baxter |
| 2020/0060221 | A1 | 2/2020 | Fan et al. |

FOREIGN PATENT DOCUMENTS

| | | | |
|---|---|---|---|
| CN | 209518062 | U | 10/2019 |
| CN | 209732234 | U | 12/2019 |
| CN | 109463289 | A | 7/2021 |
| EP | 2676543 | B1 | 12/2018 |
| FR | 2687285 | A1 | 8/1993 |
| FR | 3070822 | A1 | 3/2019 |
| WO | 1998001374 | A2 | 1/1998 |
| WO | 2002054860 | A1 | 7/2002 |
| WO | 2016190765 | A1 | 12/2016 |

OTHER PUBLICATIONS

International Search Report and Written Opinion dated Sep. 30, 2020, Application No. PCT/US2020/029776.

Notification of Transmittal of the International Preliminary Report on Patentability, dated Mar. 2, 2021, Application No. PCT/U2020/029776.

Aimicat available at https://aimicat.com/. As accessed on Sep. 9, 2020.

Catgloo available at http://pethealthintec.com/. As accessed on Sep. 9, 2020.

Catlink available at https://en.xiaomitoday.it/catlink-automatic-litter-box-youth.html. As accessed on Sep. 9, 2020.

Circle Zero available at https://plutociclezero.com/. As accessed on Sep. 9, 2020.

Igloo available at https://www.indiegogo.com/projects/igloo-reinvent-affordable-auto-cat-litter-box#/. As accessed on Sep. 9, 2020.

MEET available at https://www.slashpets.com/robotic-cat-litter-box/. As accessed on Sep. 9, 2020.

Petato Footloose available at https://www.kickstarter.com/projects/petato/footloose-next-gen-automatic-and-health-tracking-c. As accessed on Sep. 9, 2020.

Petree available at https://petreelitterboxes.com/. As accessed on Sep. 9, 2020.

Chinese First Office Action dated Jul. 20, 2022, Application No. 202080030655.7.

U.S. Non-Final Office Action dated Oct. 22, 2025, U.S. Appl. No. 18/753,049, filed Jun. 25, 2024.

24
1
22
10
5
14
20
12
18
16

1
A
10
32
14
24, 46
22
68
12
18
16
A 1
10
26
14
22
18
20

1
10
14
70
72
72
68
12

1
18
16
76
78
74
12
78
14
70

1
10
24
22
14
70
18
72
66
16
12

1
10
14
24
22
70
72
18
66
12
16

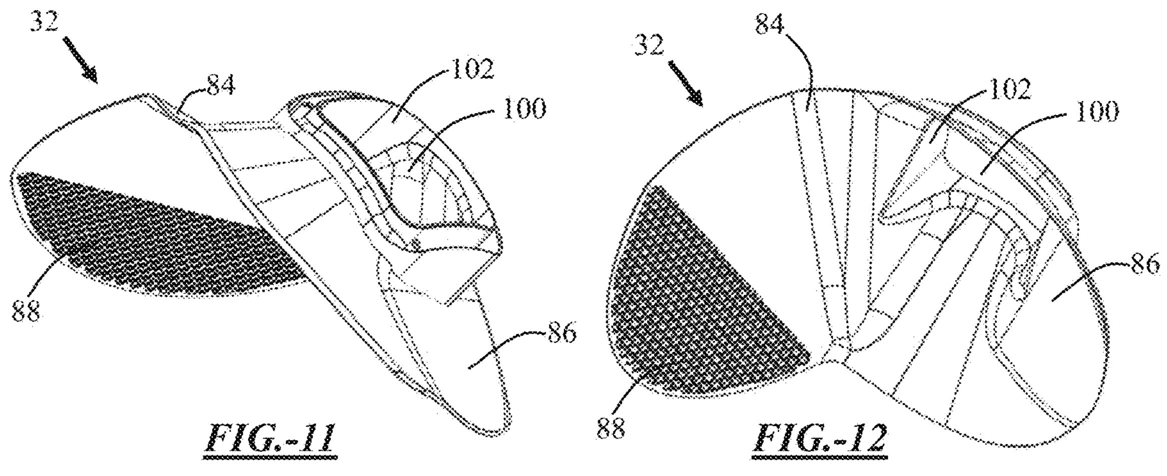
FIG.-11
FIG.-12
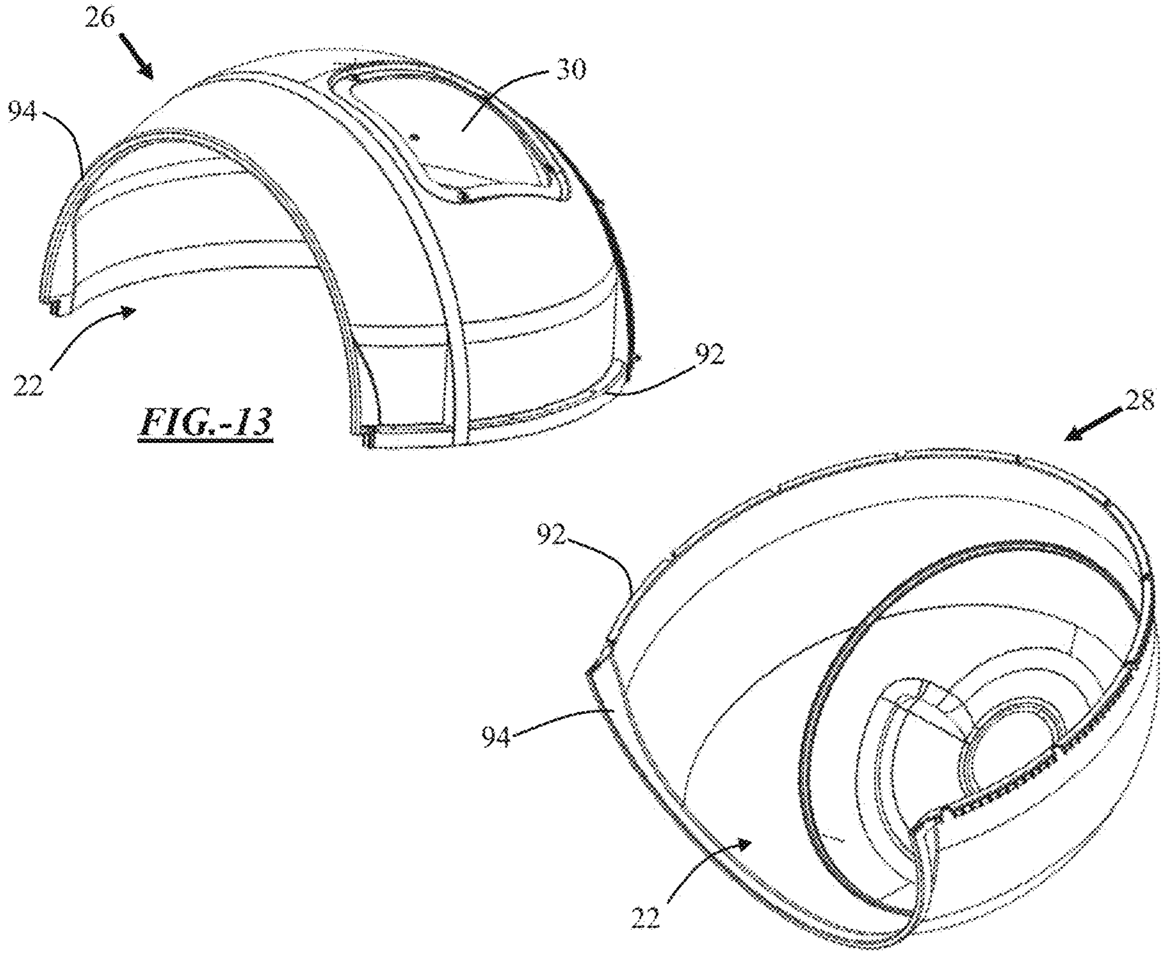
FIG.-13
FIG.-14

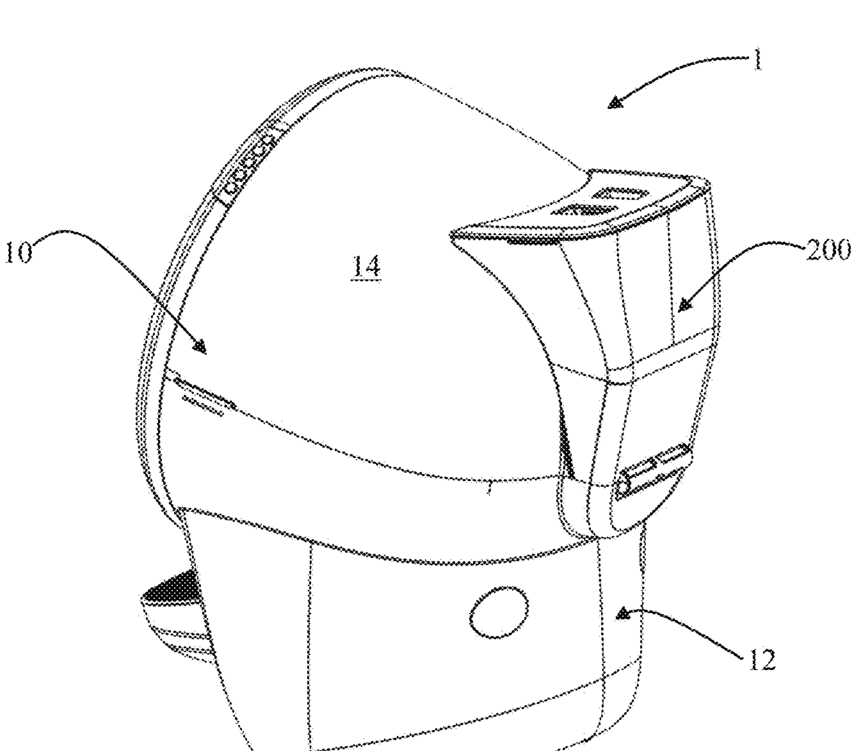
FIG.-23
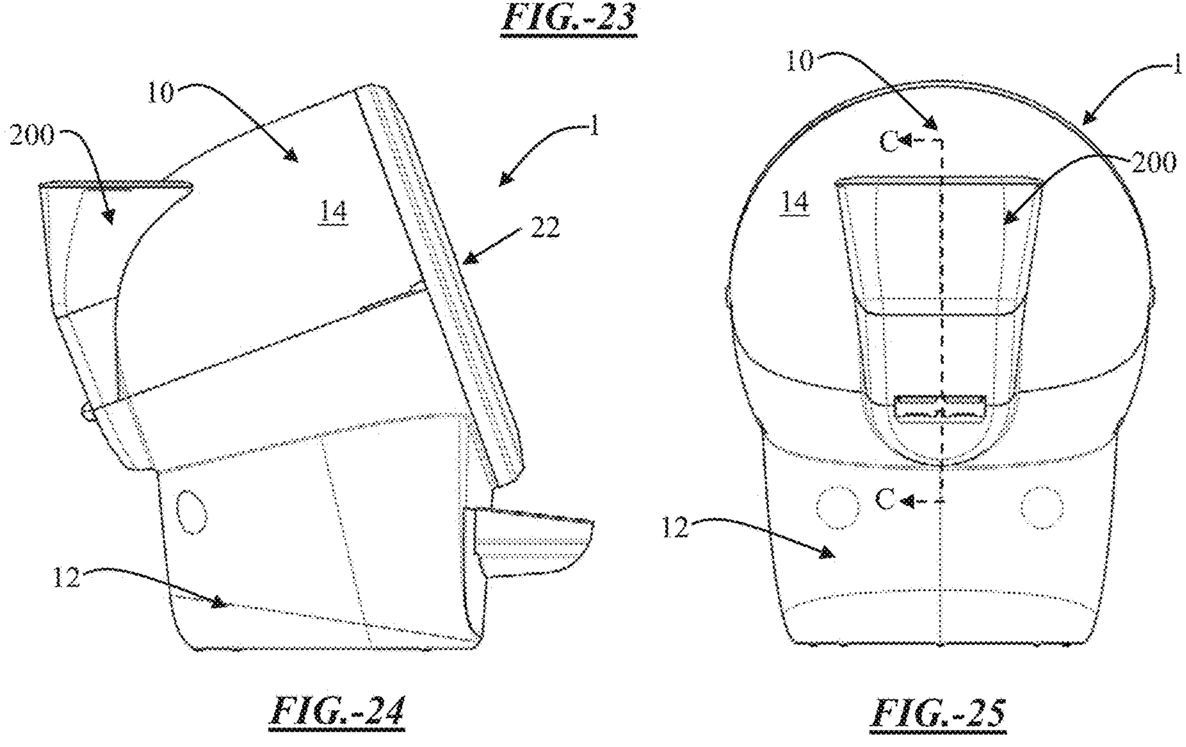
FIG.-24
FIG.-25

AUTOMATED LITTER DEVICE

FIELD

The present teachings generally relate to a litter device for use by animals which automatically removes animal waste from litter.

BACKGROUND

Automated litter devices may provide a means for pet owners (e.g., user) to effectively manage waste eliminated by one or more of their pets. These automated litter devices may be advantageous in automatically removing waste contents from litter; automatically collecting waste for subsequent disposal; storing waste contents separate from a litter chamber such that they are not exposed to the ambient environment, thereby preventing and/or reducing smell from the waste. Examples of some automated litter boxes which may be particularly beneficial may be found in U.S. Pat. Nos. 6,463,881; 8,757,094; and 9,433,185 which are incorporated by reference herein in their entirety for all purposes.

One of the challenges with respect to automated litter devices is sensing the presence of an animal within the device and avoiding a cleaning cycle with the animal present. One solution is mass sensors which can detect a change in mass within the device. One such solution is disclosed in U.S. Pat. No. 8,757,094. Another known method is one or more sensors located at or near an opening of the device. These sensors may provide a sensing curtain along the entrance of the device and sense movement of an animal when the animal passes the curtain. These sensing curtains may provide a narrow sensing range such that they only sense presence of an animal passing the opening, may not determine if an animal is entering or exiting the device, and may even be unable to detect the physical presence of the animal inside of the device. Notwithstanding the above, there is still a need for developing more precise means for detecting the presence of an animal within the device regardless of their weight and having a larger sensing range than just the entrance opening. For example, young kittens when being housetrained, may not weigh enough to trigger the difference in mass being sought by a mass sensor.

Another challenge with respect to automated litter devices is determining when a waste storage area, such as a waste bin or drawer, is near full or full and thus needs to be emptied. One or more sensors which may be used for detecting waste in a waste drawer are typically located in close proximity or within the waste drawer. Due to the proximity, the sensors are susceptible to damage from the litter, urine, or even feces over frequent usage of the device by an animal. There is a need for providing accurate waste and waste level detection of a waste drawer while keeping the sensors distanced away from the waste bin to avoid damage.

Another concern with respect to automated litter devices is managing odor when a large amount of waste is able to be collected within the device before the device needs to be emptied. As the waste drawer may prevent exposure of used litter and animal waste to the ambient environment, pet owners may wait multiple days, or even longer, before cleaning out the waste drawer. Thus, there is still a need for providing odor control for waste stored within the automated litter device for longer durations of time (e.g., consecutive days, weeks).

A challenge associated with automated litter devices is the dependence on a human for refilling with clean litter. While the device may be able to separate waste from unused litter, the device itself may have insufficient litter while still having the ability to collect waste. Insufficient litter may lead to an increase in odors, an animal being uncomfortable or unattracted to using the litter device, or even waste contacting and adhering to interior surfaces. Thus, there is a need to provide a method of more frequent litter dispensing into the litter device and allowing for the device to be used for longer periods without human interaction.

SUMMARY

The present teachings relate to an automated litter device having: a) a base; and b) a chamber configured for retaining a litter and rotatably supported by the support base, wherein the chamber includes: i) an entry opening so that an animal can enter and exit the chamber; and ii) a waste opening generally opposing the entry opening configured so that animal waste passes through the waste opening into the base upon rotation of the chamber; wherein the automated litter device includes one or more of: i) one or more sensors located adjacent to the entry opening which are adapted to sense the presence of the animal within the chamber, a level of the waste stored in a waste bin in the base, a level of litter in the chamber, a position of the chamber relative to the base, or any combination thereof; ii) a filtering system configured for reducing, eliminating, and/or preventing malodors building in the base; and/or iii) a litter dispenser in communication with the chamber to transfer some of the litter to the chamber.

The automated litter device of the present teachings provides for one or more sensors which may be affixed in proximity to the chamber and entry opening. The one or more sensors may be one or more laser sensors. The one or more sensors may be located on a bezel located about the entry opening. The one or more sensors may be able to detect the presence of an animal without relying on their mass. The chamber may be tilted relative to a vertical axis. The one or more sensors may be able to detect the presence of the animal within the chamber due to the tilt of the chamber. The one or more sensors may be able to detect the presence of waste, certain levels or amounts of waste, or both. The one or more sensors may be aligned with one or more openings of the device to have a line of sight into a waste bin. A tilt of the chamber may allow for the one or more sensors to have the line of sight into the waste bin via the waste opening when the chamber rotates during a cleaning cycle. The one or more sensors may be distanced from a waste bin. The one or more sensors may even be useful for detecting a position of the chamber during a cleaning cycle. The automated litter device may include a filtering system. The filtering system may provide for an active means, passive means, or both for reducing or even eliminating malodor collecting in a base of the device. The automated litter device may be compatible with or include a litter dispenser. The litter dispenser may be automated. The litter dispenser may be in fluid communication with an interior of a chamber of the litter device. The litter dispenser may dispose clean, unused litter into the interior of the chamber.

BRIEF DESCRIPTION OF DRAWINGS

FIG. 11 is a perspective view of a septum according to the teachings herein.

FIG. 12 is another perspective view of a septum according to the teachings herein.

FIG. 13 illustrates an upper chamber according to the teachings herein.

FIG. 14 illustrates a lower chamber according to the teachings herein.

FIG. 23 is a perspective view of an automatic litter device according to the teachings herein.

FIG. 24 is a left side view of an automatic litter device according to the teachings herein.

FIG. 25 is a rear view of an automatic litter device according to the teachings herein.

DETAILED DESCRIPTION

Figures 1, 2, 3:
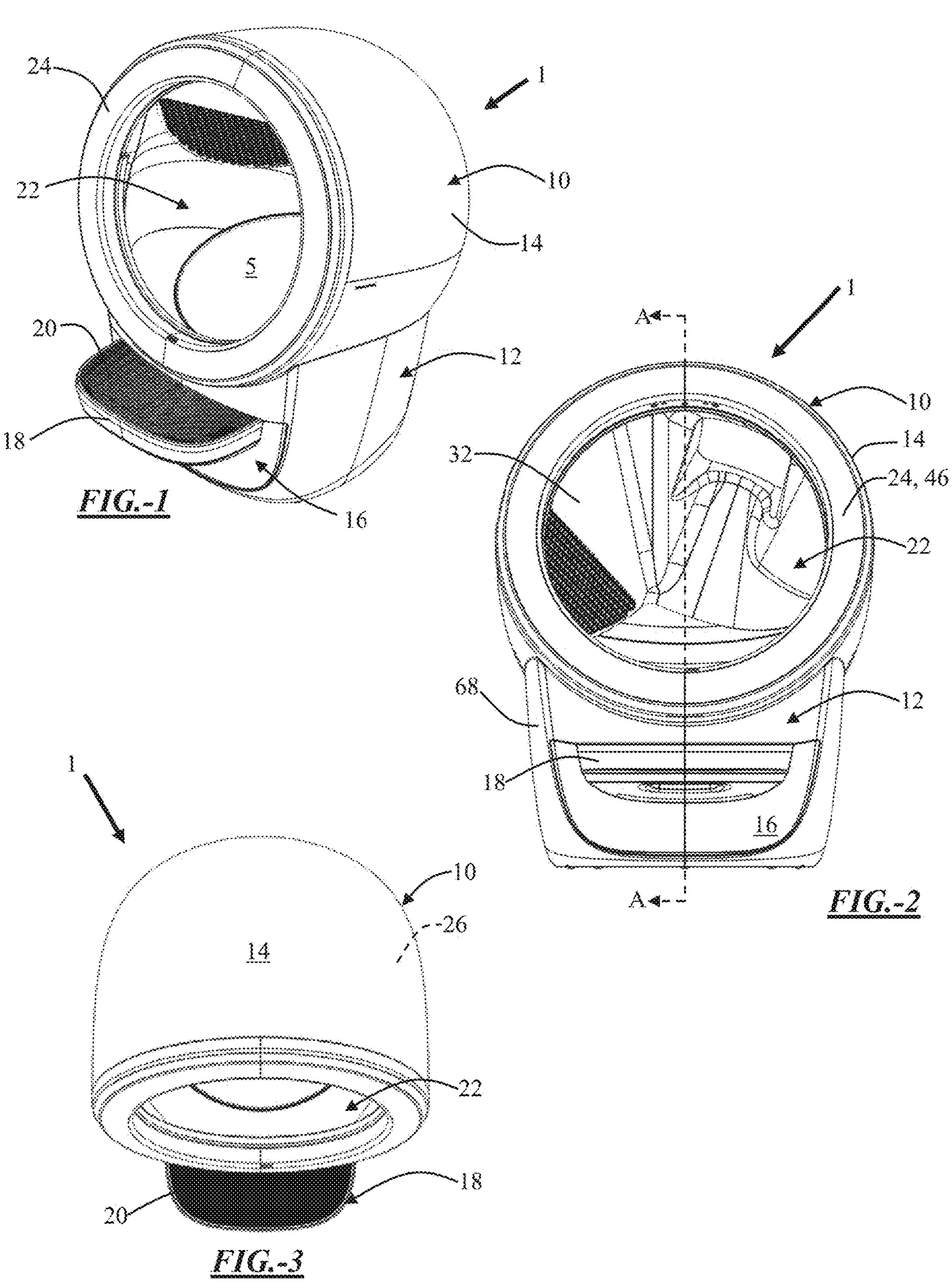
FIG. 1 is a perspective view of an automatic litter device according to the teachings herein.
FIG. 3 is a front view of an automatic litter device according to the teachings herein.
FIG. 2 is an exploded view of an automatic litter device according to the teachings herein.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Litter Device

The present teachings relate to a device that includes litter for use by an animal. The device may be a litter device. The litter device may be an automated litter device. The device may function to retain litter, sort used litter from unused litter, collect animal waste, remove animal waste, divide animal waste from litter, temporarily store animal waste, or any combination thereof. The device may have the ability to replace used litter with unused litter. The device may be useful by one or more domesticated animals. One or more domesticated animals may include one or more cats, rabbits, ferrets, pigs, dogs, ducks, goats, foxes, the like, or any combination thereof. The device may be compatible with one or more types of litter. One or more types of litter may include clumping clay, non-clumping clay, silica gel crystals, recycled paper, pine, corn wheat, walnut shells, the like, or any combination thereof.

The litter device includes a chamber. The chamber may function to house clean litter, provide a space for an animal to enter and excrete waste, or both. The chamber may have any size and shape which is able to retain sufficient litter for an animal to use during waste elimination, allow for an animal to comfortably use the litter box, or both. The chamber may have a three-dimensional shape which is substantially spherical, ovoidal, cylindrical, cuboidal, conical, pyramidical, the like, or any combination thereof. A shape which is substantially spherical, ovoidal, cylindrical, and/or the like may be beneficial in providing for rotation of the chamber during a cleaning cycle, avoiding litter and/or waste from collecting along one or more vertices, or a combination thereof. For example, the chamber may be shaped like a globe, sphere, football, egg, the like, or a combination thereof. The chamber may be capable of rotation during a cleaning cycle. The chamber may be rotatably supported by a base. The base may be located between the chamber and a surface upon which the litter device rests. The chamber may have a generally hollow interior to accommodate one or more septums, liners, litter, and the like. The chamber may include an entry opening, waste opening, or both. The chamber may have a generally hollow interior to accommodate one or more animals during use. The chamber may have a size which is able to accommodate one or more animals which are about 1 kg or greater, about 2 kg or greater, about 4 kg or greater, about 8 kg or greater, or even about 10 kg or greater. The chamber may have a size which is able to accommodate one or more animals which are about 30 kg or less, about 25 kg or less, about 20 kg or less, or even about 15 kg or less. The hollow interior may form a volume of the chamber. The volume of the chamber may be about 16.000 $cm^3$ or greater, about 32.500 $cm^3$ or greater, or even about 65,000 $cm^3$ or greater. The volume of the chamber may be about 150,000 $cm^3$ or less, about 100.000 $cm^3$ or less, about 85.000 $cm^3$ or less, or even about 75.000 $cm^3$ or less. The chamber may have a volume that is usable by an animal which can fit through an entry opening. The usable volume may be any volume such that the chamber may be used by an animal to excrete waste. The usable volume may be any volume such that an animal can enter, turn, and move around within the chamber. The volume of the chamber may be the usable volume, the total volume, or both. The usable volume may be the volume within the hollow interior of the chamber minus the volume occupied by litter and any components internally located within the chamber. The total volume may be the actual volume of the hollow interior of the chamber. The chamber may be formed by a single piece or a plurality of pieces. The chamber may include one or more filter systems affixed thereto, in fluid communication therewith, or both. The chamber may be formed by a single piece having a substantially spherical shape. The chamber may be formed by two or more pieces which mate to form a substantially spherical shape. The chamber may be formed by an upper chamber and lower chamber.

The chamber may include an upper chamber and a lower chamber. The upper chamber and the lower chamber may function to mate together to form the chamber, an entry opening, or both. The upper chamber and lower chamber may mate together to form a shape and/or size of the chamber. The upper chamber, lower chamber, or both may form 25% of the chamber or greater. 35% of the chamber or greater, or even 50% of the chamber or greater. For example, the upper chamber and lower chamber may each have a shape which is substantially hemispherical. The hemispherical shapes may mate together to form a shape which is substantially spherical, ovoidal, or the like. The upper chamber, lower chamber, or both may house one or more filter systems. The upper chamber, lower chamber, or both may include one or more filter cavities. The one or more filter cavities may function as a filter housing. For example, the lower chamber may include a filter cavity on an underside. An underside may be the surface of the lower chamber facing toward a waste drawer when the chamber is in a home position. The upper chamber, lower chamber, or both may include one or more flanges. The one or more flanges may be formed about one or more rims of the upper chamber, lower chamber, or both. The one or more flanges may mate with one or more other flanges. For example, a flange of an upper chamber may align and mate with a flange of a lower chamber. The upper chamber, lower chamber, or both may have one or more cut-outs, contours, and the like. The upper chamber, lower chamber, or both may have a cut-out which forms a portion of an entry opening. For example, the upper chamber may have a cut-out which forms an upper portion of an entry opening and the lower chamber may have a cut-out which forms a lower portion of an entry opening.

The chamber may include an axis of rotation. The axis of rotation may function as the relative axis about which the chamber rotates during one or more cleaning cycles. The axis of rotation may have any orientation such that the usable volume of a chamber is increased; the litter relative to the chamber has a conical rotation; litter is funneled toward a rear of the chamber (e.g., away from the front opening), toward and through a screen and/or septum, or both; a larger entry opening may be used without litter spilling therefrom; a screen and/or septum can be located further back in the chamber creating more internal space; or any combination thereof. The axis of rotation of the chamber may form an angle with a vertical plane, horizontal plane, or both. A vertical plane may be substantially in the direction of gravity, parallel to gravity, or both. A horizontal plane may be substantially perpendicular to a direction of gravity, parallel to a surface upon which the litter device rests, or both. The axis of rotation of the chamber may form any angle with a vertical plane, horizontal plane, or both so that one or more of the teachings herein are achieved. The axis of rotation may form an angle of about 88 degrees or less, about 85 degrees or less, about 80 degrees or less, about 75 degrees or less, or even about 70 degrees or less with a vertical plane. The axis of rotation may form an angle of about 40 degrees or greater, about 45 degrees or greater, about 50 degrees or greater, about 55 degrees or greater, about 60 degrees or greater, or even about 65 degrees or greater with a vertical plane. The axis of rotation may form an angle of about 40 degrees to about 88 degrees, of about 55 degrees to about 80 degrees, of about 40 degrees to about 85 degrees, or even about 60 degrees to about 75 degrees with a vertical plane. The axis of rotation may form an angle with the horizontal plane that is complementary to the angle relative to the vertical plane. The angled axis of rotation may funnel clumps of waste and/or litter, waste, or both toward a common location. The common location may be located toward a rear, bottom, or both of the chamber. The common location may be a septum, screen, waste opening, waste bin, or any combination thereof. The axis of rotation may allow for a single waste opening to be used, waste to be funneled toward the waste opening, waste to transfer for the waste opening to a waste bin, or any combination thereof.

The angled axis of rotation along with the frictional characteristics of the litter may result in a litter bed with an angle of repose. The angle of repose may function so that litter is angled away from an entry opening, litter is prevented from spilling from an entry opening, an entry opening may be as large as possible while keeping litter within the chamber, or any combination thereof. The angle of the litter bed may be angled such that the litter is angled away from an entry opening. Angled away from an entry opening may mean that a depth of the litter proximate to an entry opening is smaller than a depth of the litter more distant from the entry opening (e.g., the litter depth increases as the distance of the litter increases from the entry opening). The angle of the litter bed may be any angle such that the ability of an animal accidentally moving litter outside of opening is reduced compared to a litter bed that is free of an angle. Free of an angle may mean about perpendicular to the vertical plane, parallel to the horizontal plane, or both. The angle of the litter bed may form an angle that is about 89 degrees or less, about 88 degrees or less, about 87 degrees or less, or even about 85 degrees or less with the vertical plane. The angle of the litter bed may form an angle that is about 70 degrees or greater, about 75 degrees or greater, or even about 80 degrees or greater with the vertical plane. For example, the angle of the litter bed may be about 75 degrees to about 88 degrees, or even about 80 degrees to about 87 degrees with the vertical plane. The litter bed may rest on any surface of the chamber.

The chamber may include a liner. The liner may prevent direct contact between litter and a chamber interior while the chamber is in a home position. The liner may cover a portion or all of an interior surface of the chamber. The liner may be any size, shape, and/or configuration such that it contacts the litter; retains litter, waste, liquids, solids, semi-solids, or a combination thereof in the chamber. The liner may be any size and/or shape such that it allows the litter resting thereon to absorb, encircle, clump, or a combination thereof to the waste after elimination by an animal. The liner may have a shape substantially reciprocal with the contour of a chamber, upper chamber, lower chamber, or a combination thereof. For example, the liner may have a shape which is substantially hemispherical. The liner may be directly adjacent to and in contact with an interior of the chamber. For example, the liner may be in direct contact with an interior surface of a lower chamber. The liner may be affixed to, free of attachment to, or both to a chamber. The liner may be at least partially affixed to a lower chamber. The liner may be partially free of attachment to any part of the chamber. Free of attachment may allow for the liner to temporarily distance itself from an interior surface of the chamber (e.g., drop, loosen) during one or more cleaning cycles. This distancing motion, whether dropping or loosening or the like, may allow for waste temporarily stuck to the liner to loosen and move toward the waste opening. One or more edges, a central region, or both may be affixed to, free of attachment to, or both to the chamber. For example, the edges of liner may be connected to the chamber while a central region may be free of attachment. The central region free of attachment may drop and/or loosen during a cleaning cycle while the edges remain affixed to the chamber. The liner may include a weight. The weight may function to cooperate with gravity, so the liner partially drops during a cleaning cycle, returns back to resting within the lower chamber when in a home position, or both. The weight may be affixed to, reside in, or both an underside of the liner. The weight may be located between a liner and lower chamber. The weight may be located in a weight cavity within the liner. The underside of the liner may include a weight cavity formed therein. The underside may be the side of the liner facing toward and adjacent to a lower chamber. The weight cavity may have a shape reciprocal with that of the weight. The weight cavity may be spherical, ovoidal, cylindrical, cuboidal, conical, pyramidical, the like, or any combination thereof. The liner may be comprised of a suitable material. The material may be non-stick; liquid impenetrable; resistant to damage, penetration, scent absorption, stain, or a combination thereof by litter, waste, liquids, solids, semi-solids, or a combination thereof. The liner material may be rubber, plastic, a synthetic material, a natural material, or any or a combination thereof.

The chamber includes an entry opening. The entry opening allows for one or more animals to comfortably enter and exit the chamber. The entry opening may be any size and shape so that one or more animals may enter and exit the chamber. The entry opening may be any size and shape so that during entry, use, and/or exiting by an animal; during one or more cleaning cycles; or any combination thereof litter is substantially maintained within the chamber. The entry opening may have a profile shape and/or cross-section which is substantially circular, ovular, elliptical, square, rectangular, trapezoidal, triangular, rhombus, the like, or any combination thereof. The profile shape may be a shape looking at an opening plane straight on, perpendicular, or both. The entry opening may have a profile shape which is symmetrical, non-symmetrical, or both. An entry opening which is circular, ovular, or the like may offer a more comfortable and larger entry area, may avoid sharp vertices that may scratch an animal, may avoid sharp vertices which may catch litter upon exit of the animal from the chamber, or a combination thereof.

The entry opening may form an opening plane. The opening plane may extend along the entry opening (e.g., along a surface that extends from the top of the entry opening to the bottom of the entry opening). The entry opening, the opening plane, or both may form an angle with a vertical plane. The entry opening, opening plane, or both may form an angle with the vertical plane of about 5 degrees or more, about 10 degrees or more, or even about 15 degrees or more, about 18 degrees or more, or even about 20 degrees or more. The entry opening, opening plane, or both may form an angle with the vertical plane of about 60 degrees or less, about 45 degrees or less, about 30 degrees or less, or even about 25 degrees or less. For example, the entry opening, opening plane, or both may form an angle with the vertical plane of about 10 degrees to about 30 degrees. As another example, the entry opening, opening plane, or both may form an angle with the vertical plane of about 15 degrees to about 25 degrees (i.e., about 20 degrees). The angle of the entry opening, opening plane, or both relative to the vertical plane may allow for litter to be maintained within the chamber, the entry opening to be as large as possible while maintaining litter within the chamber, provide a larger interior surface area for a litter bed, allow for one or more sensors to have a line of sight into an interior of the chamber, or any combination thereof.

The entry opening may include one or more axes. The one or more axes may assist in defining the width, height, shape, cross-sectional area, or any combination thereof of the entry opening. The one or more axes may include a primary axis and secondary axis. A primary axis may be substantially parallel with the opening plane, angled relative to the vertical plane and/or horizontal plane, may extend from the top of the entry opening to the bottom of the entry opening, or any combination thereof. The top of the entry opening may be defined as opposite the bottom. The bottom may be defined as a portion closest to the base of the litter device. The primary axis may define a height of the entry opening. A secondary axis may be substantially parallel with the opening plane, perpendicular to the primary axis, parallel with a horizontal plane, may extend from one side to an opposing side, or any combination thereof. The secondary axis may define a width of the entry opening. The length of the primary axis and the length of the secondary axis may form a ratio. The ratio may be such that an animal can comfortably fit within the entry opening to enter and exit the chamber, litter and waste contents remain within the chamber, or both. The ratio of the length of the primary axis to the secondary axis may be about 1:3 or greater, about 1:2.5 or greater, about 1:2 or greater, about 1:1.5 or greater, about 1:1.2 or greater, or even about 1:1 or greater. The ratio of the length of the primary axis to the secondary axis may be about 3:1 or less, about 2.5:1 or less, about 2:1 or less, about 1.5:1 or less, about 1.2:1 or less, or even about 1.1:1 or less. The axis of rotation may run at an angle relative to the primary axis, secondary axis, or both. The axis of rotation may be at an angle acute, perpendicular, or obtuse to the primary axis, secondary axis, or both. The axis of rotation may be at an angle of about 60 degrees or greater, about 70 degrees or greater or even about 85 degrees or greater relative to the primary axis, secondary axis, opening plane, or any combination thereof. The axis of rotation may be at an angle of about 120 degrees or less, about 110 degrees or less, or even about 95 degrees or less relative to the primary axis, secondary axis, opening plane, or any combination thereof. For example, the axis of rotation may be at an angle of about 85 degrees to about 95 degrees (e.g., about 90 degrees) relative to the primary axis and secondary axis.

The entry opening has a cross-sectional area. The cross-sectional area may be sufficiently large to comfortably accommodate an animal entering and exiting the chamber while maintaining litter and waste within the chamber. The cross-sectional area may be the cross-sectional area of the profile shape of the entry opening. The cross-sectional area may be measured along one or more planes parallel to the opening plane, primary axis, secondary axis, or a combination thereof. The cross-sectional area of the entry opening may be about 300 $cm^2$ or greater, about 500 $cm^2$ or greater, about 700 $cm^2$ or greater, about 900 $cm^2$ or greater, about 1.100 $cm^2$ or greater, or even about 1.200 $cm^2$ or greater. The cross-sectional area of the entry opening may be about 5.000 $cm^2$ or less, about 4.000 $cm^2$ or less, about 3.000 $cm^2$ or less, about 2.000 $cm^2$ or less, or even about 1.500 $cm^2$ or less. The height of the entry opening along a primary axis may be about 20 cm or greater, about 25 cm or greater, about 30 cm or greater, or even about 40 cm or greater. The height of the entry opening along a primary axis may be about 75 cm or less, about 60 cm or less, about 55 cm or less, or even about 50 cm or less. The height and width of the entry opening may be defined by an inner surface of a chamber, bezel, or both at the entry opening. The entry opening may include an entry lip.

The litter device may include a bezel. The bezel may function to define the entry opening, provide an aesthetic appearance of a front of the litter device, maintain litter within the chamber, seal off any joints along the front of the device from litter, seal off any pinch points at and/or around the entry opening, house one or more sensors, house one or more control panels, the like, or any combination thereof. The bezel may have any shape, size, and/or form such the bezel may be able to provide a barrier for litter and/or other waste remnants while not interfering with entry and egress of an animal from the chamber. The bezel may have any size and/or shape for defining and/or encircling an entry opening. The bezel may have a shape reciprocal, similar, and/or same as the entry opening. The bezel may have a substantially circular and/or oval cross-sectional shape with an opening therein. The opening may define part of the entry opening and have similar and/or same dimensions as suitable for the entry opening. The bezel may have a shape and size so as to conceal one or more rims, edges, or both of a bonnet, base frame, chamber, or a combination thereof. The bezel may have a shape and size so as to conceal the space between a chamber and bonnet, chamber and base frame, or both. The bezel may be formed as a single piece or multiple pieces. The bezel may include an inner bezel, outer bezel, or both. The outer bezel may function to provide an aesthetically appealing bezel about the entry opening, conceal one or more components affixed to the inner bezel, or both. The inner bezel may function to retain one or more electrical components, affix the bezel to a bonnet, base, or both. The inner bezel and outer bezel may cooperate together to define a gap therebetween. The gap within the bezel may house one or more sensors, electrical components, control panels or components thereof, or any combination thereof. The inner bezel may be permanently and/or removably affixed to a bonnet, base frame, outer bezel, or a combination thereof. The inner bezel, outer bezel, or both may be affixed to the outer bezel, inner bezel, bonnet, base frame, or a combination thereof by one or more fasteners. The one or more fasteners may include one or more threaded fasteners (e.g., screw, bolt, nut), interlocking tabs, rivets, pins, the like, or a combination thereof. The inner bezel may be affixed to both the base frame and the bonnet. The inner bezel may be affixed along cut-outs of the base frame and bonnet which define an entry opening. The outer bezel may then be affixed to the inner bezel. The bezel may be comprised of one or more materials suitable for exposure to litter, waste, moisture, fumes, and the like. Examples of materials that can be used are rubber, plastic, metal, ceramic, or a combination thereof. The bezel may be made of the same or a different material as the bonnet, base frame, or both. The inner bezel, outer bezel, or both may include one or more mounts extending therefrom and into the gap of the bezel, toward the opposing bezel, into an interior of a bezel, to an exterior of the bezel, or a combination thereof. One or more mounts may include one or more sensor mounts, control mounts, or both. One or more sensor mounts may include one or more sensor boards. One or more sensor mounts may retain one or more sensors. One or more sensor mounts may be located within an interior, exterior, or both of the bezel. One or more control mounts may house and/or retain one or more control panels and/or user interfaces. One or more control mounts may be located within an interior, exterior, or both of the bezel.

The chamber includes one or more waste openings. The one or more waste openings may function to allow waste, used litter, or both to transfer from the chamber into the base, waste bin, or both. The waste opening may be at any location in the chamber so that the waste, used litter, or both may transfer from the chamber into a waste bin. The waste opening may be at any location in the chamber that aligns with the waste bin during a cleaning cycle, off-set from the waste bin while in a home position, or both. The waste opening may be formed as an aperture in an upper chamber, lower chamber, or both. For example, the waste opening may be formed as an aperture in the upper chamber such that it resides substantially opposite the waste bin while the chamber is in a home position. The waste opening may have any shape suitable for allowing waste to quickly transfer from the chamber to the waste drawer during a cleaning cycle. The waste opening may have a cross-sectional shape which is substantially circular, ovular, square, rectangular, trapezoidal, triangular, rhombus, the like, or any combination thereof. The waste opening may have a shape which is reciprocal with a cross-sectional shape of the waste bin. The waste opening may be located partially or completely on one side of a longitudinal plane of the device. The longitudinal plane may intersect the rotational axis, vertical plane, horizontal plane, or a combination thereof. The rotational axis, vertical plane, or both may be parallel to, lie within, or both to the longitudinal plane. The horizontal plane may be substantially perpendicular to the longitudinal plane. The longitudinal plane may divide the litter device into side halves. The side halves may each comprise a portion of the bonnet, chamber, and base. The side halves may be substantially symmetrical and/or mirrored about the longitudinal plane. Substantially symmetrical may still allow for certain features to be only located on one side of the device, such as a waste opening. A center of the waste opening may be offset from the longitudinal axis by an angle. A center of the waste opening may be angled from the longitudinal plane by about 0° or more, about 5° or more, about 10° or more, about 15° or more, or even about 20° or more. A center of the waste opening may be angled from the longitudinal plane by about 45° or less, about 35° or less, about 30° or less, or even about 25° or less. The angle may be measured when a chamber is in a home position. The waste opening may be located on one or more sides of a track. The waste opening may be located between an entry opening and a track. The waste opening while the chamber is in a home position, may not overlap with the waste bin. The waste opening, during a cleaning cycle, may substantially align, overlap, or both with a waste bin. The waste opening, during a cleaning cycle, may be rotated about the rotational axis. The waste opening, during a cleaning cycle, may rotate from a home position to an emptying position, a home position, any position therebetween, or a combination thereof. The emptying position may be when the chamber is rotated such that the waste opening is located adjacent to, overlapping with, substantially centered with, or a combination thereof the waste bin. The waste opening, during a cleaning cycle, may rotate by an angle of about 130° or greater, about 145° or greater, about 150° or greater, about 155° or greater, or even about 160° or greater to an emptying position. The waste opening, during a cleaning cycle, may rotate by an angle of about 230° or less, about 220° or less, about 200° or less, or even about 180° or less to an emptying position. The waste opening may rotate a complete revolution (e.g., 360°) from the start of a cleaning cycle to the end of a cleaning cycle. Rotation of the waste opening may occur when a track is rotated. Rotation of a track may rotate the chamber and the waste opening.

The chamber may include a rotation device. The rotation device may function to rotate the chamber about a rotational axis, rotate the chamber during a cleaning cycle, or both. The rotation device may be a track, gear, high friction surface, raised area, toothed area, contact surface area, the like, or a combination thereof. The rotation device may be affixed to, integral with, in rotational communication with, or a combination thereof the chamber. The rotation device may be located on an exterior, interior, or both of the chamber. The rotation device may be a belt, a cog, a sprocket, a toothed assembly, rollers, a wheel, the like, or a combination thereof. The chamber may include a track about at least a portion of an exterior of the chamber. The base may include one or more drive sources in rotational communication with and which drives the rotation device.

The chamber may include a track. The track may function to rotate the chamber about a rotational axis, cooperate with a drive source, or both. The track may have any suitable configuration for cooperating with and being driven by a drive source. The track may include or be a gear, toothed, or both. A gear may be a spur gear, helical gear, internal gear, the like, or a combination thereof. For example, the track may be a spur gear with teeth evenly spaced and projected about the perimeter. The track may be located about at least a portion of a periphery of the chamber. The track may be located about a portion of an upper chamber, lower chamber, or both. The track may encircle an outside wall of the chamber. The track may be located anywhere along an exterior of the chamber. The track may lay in and/or form a plane referred to as a track plane. The track plane may form an angle relative to the opening plane, vertical plane, horizontal plane, or a combination thereof. The track plane may be substantially parallel to the opening plane. The track plane may be substantially normal to an axis of rotation. The track plane may be at an angle relative to the vertical plane substantially similar as the opening plane. The track plane may form an angle with the vertical plane of about 5 degrees or more, about 10 degrees or more, or about 15 degrees or more, about 18 degrees or more, or even about 20 degrees or more. The track plane may form an angle with the vertical plane of about 60 degrees or less, about 50 degrees or less, about 45 degrees or less, about 30 degrees or less, or even about 25 degrees or less. For example, the track plane may form an angle with the vertical plane of about 5 degrees to about 50 degrees. As another example, the track plane may form an angle with the vertical plane of about 10 degrees to about 30 degrees. The track may be fairly concentric, off-set, or both relative to a center, great circle, lesser circle, or a combination thereof of the chamber. The track may be offset from the great circle of the chamber. A great circle may be defined as the circle which acts as an equator of the chamber, is located about the widest diameter of the chamber, is substantially parallel to an entry opening of a chamber, or a combination thereof. A great circle may be perpendicular to or be the joint between the upper chamber and lower chamber. The track may be offset from the great circle of the chamber. The track may be closer to an entry opening, front, rear, or a combination thereof of the chamber. The track may be distanced from the entry opening. The track may be located generally opposite the entry opening. The track may be distanced from the entry opening by about 45% or greater, about 60% or greater, about 70% or greater, about 75% or greater, or even about 80% or greater of a total length of a chamber. The track may be distanced from the entry opening by about 95% or less, about 93% or less, about 90% or less, about 87% or less, or even by about 85% or less of a total length of a chamber. The length of the chamber may be measured from the entry opening toward the rear, along a rotational axis, or both. The track may be used to rotate the chamber about the axis of rotation during a cleaning cycle. The track may be used to rotate the chamber clockwise, counterclockwise, or both. The track may be concealed by the bonnet, base, or both. Concealing the track may avoid creating pinch points or unnecessary contact points for one or more animals, humans, or both.

The litter device may include a bonnet. The bonnet may function to cover a track, cover a waste opening, provide an aesthetically appealing exterior, protect against one or more pinch points or contact points with one or more moving components, prevent contaminants (e.g., liquid, dust, fur, etc.) from entering into the device (e.g., such as between the track and drive source), or a combination thereof. The bonnet may partially or fully cover a track, waste opening, or both while the chamber is in home position, during a cleaning cycle, in an emptying position, or any combination thereof. The bonnet may be static, mobile, or both relative to the chamber when the chamber rotates. The bonnet being static relative to the chamber may allow for the bonnet to continuously cover the track, waste opening, pinch points, or a combination thereof while the chamber is in motion. The bonnet being static relative to the chamber may provide case in manufacturing, reliability during use, or both. The bonnet may have any suitable shape and/or size for covering and/or concealing a track, waste opening, or both; being located over and/or about at least a portion of a chamber; or any combination thereof. The bonnet may have a shape substantially reciprocal with the contour of a chamber, upper chamber, lower chamber, or a combination thereof. For example, the bonnet may have a shape which is substantially hemispherical. The bonnet may be substantially solid, continuous, have one or more openings, discontinuous, the like, or any combination thereof. The bonnet may be free of or include one or more openings. The one or more openings may align with a waste opening while the chamber is in a home position. The one or more openings may include a transparent covering. The transparent covering may allow for light to pass through while still physically covering a waste opening. The one or more openings may allow natural light into the chamber interior. The bonnet may be affixed to a base, bezel, litter dispenser, or a combination thereof. The bonnet may be permanently and/or removably affixed to a base, base frame, bezel, litter dispenser, or a combination thereof. The bonnet may be pivotably engaged with the base, base frame, or a combination thereof. The bonnet may be affixed to the base and/or base frame by one or more hinges, fasteners, or both. One or more fasteners may include one or more threaded fasteners (e.g., screw, bolt, nut), interlocking tabs, rivets, pins, the like, or a combination thereof. The bonnet may be affixed to the base and/or base frame by one or more hinges opposite an entry opening. The bonnet may be affixed to the base and/or base frame by one or more interlocking tabs where the bonnet mates with the base and/or base frame. The bonnet may be affixed to the bezel with one or more interlocking tabs where the bonnet mates with the bezel about the entry opening. The bonnet may be attached by one or more conductive fasteners to the bezel, base, base frame, or a combination thereof. One or more conductive fasteners may conduct current from the bezel, base, base frame, or a combination thereof to the bonnet. The flow of current via one or more conductive fasteners may indicate the bonnet is affixed to the base, base frame, and/or bezel. The stop of current flow via the one or more conductive fasteners may indicate the bonnet has been removed from the base, base frame, and/or bezel. One or more cleaning cycles may be prevented from occurring, the chamber may be prevented from rotating, or both when the bonnet is removed from the base, base frame, and/or bezel. The bonnet may include one or more interlock sensors as described in U.S. Pat. No. 8,757,094 and US Patent Application Publication No: 2013/0333625, incorporated herein by reference.

The litter device may eliminate waste during one or more cleaning cycles. A cleaning cycle may function to transfer waste from a chamber to a waste bin, waste drawer, base, the like, or any combination thereof. The cleaning cycle may function to rotate the chamber about a rotational axis. During a cleaning cycle, the chamber may rotate clockwise, counterclockwise, or both. A direction of rotation may be dependent on orientation of a septum, screen, or both.

The litter device includes a base. The base may function to support a chamber, house a waste drawer, house one or more electrical components, or any combination thereof. The base may have any size and shape so that the base may support the chamber, house a waste drawer, and/or house one or more electrical components. The base may rotatably support the chamber. The base may allow the chamber to rotate during one or more cleaning cycles. The base may be configured to rest on a surface. A surface may be any suitable surface for having a litter device resting thereon. The surface may be a floor, table, platform, substantially planar surface, or any combination thereof. The base may include one or more base frames, waste drawers, drawer cavities, chamber supports, steps, electrical components, ports, filters, the like, or any combination thereof.

The base may include a base frame. The base frame may have any size and/or shape to support a chamber; mate with a bonnet; house a waste drawer, one or more electrical components, one or more filters and/or filter systems; rest on a surface; the like, or a combination thereof. The base frame may have a three-dimensional shape which is substantially spherical, ovoidal, cylindrical, hemispherical, cuboidal, conical, pyramidical, the like, or any combination thereof. For example, the base frame may have a first shape which is substantially cuboidal and/or cylindrical which extends to a second shape which is hemispherical. The base frame may have a shape which is substantially reciprocal to the shape of a waste drawer, chamber, or both. For example, the first shape which is substantially cuboidal and/or cylindrical may house the waste drawer while the second shape may be hemispherical and house a lower chamber. The second shape may include a cut-out. The cut-out may have a shape reciprocal with that of a chamber, entry opening, bezel, or both. The cut-out may be located on a same side of the device as the entry opening. The cut-out may be substantially U-shaped. The base frame may be affixed to a bezel at an open-end, along a cut-out, or both. The base frame may include a bottom. The bottom may be a closed end of the base frame. The bottom may be opposite an open end, chamber support, or both of the base frame. The bottom may function to allow the base frame to rest on a surface. The bottom may have one or more features for adapting to uneven surfaces. The bottom may be substantially planar, flat, reside in one plane, or a combination thereof. The bottom may include one or more ridges, feet, or both. The one or more feet may be adjustable so that the litter device may rest level on a surface. Adjacent to the bottom there may be a drawer cavity. The drawer cavity may function to house a waste drawer. The drawer cavity may be formed as a hollow interior in the base frame. The hollow interior may be reciprocal to, larger than, or both a waste drawer. The drawer cavity may include a waste drawer track. A waste drawer track may provide a track for the waste drawer to slide along when either opening or closing, maintain alignment of the waste drawer, guide installation of a waste drawer into the drawer cavity, or any combination thereof. A waste bin may reside within the drawer cavity. The base frame may include a drawer opening. The drawer opening may be formed as an opening in the base frame. The drawer opening may be located on a same or different side as an entry opening, hinge, or a combination thereof. The drawer opening may have a cross-sectional shape substantially reciprocal to the cross-sectional shape of a waste drawer. The drawer cavity may be defined as the space between the bottom of the base frame and a chamber support. The base frame may be in fluid communication with a filter system. The base frame may include one or more port openings. One or more port openings may be located on a rear side, opposite a waste drawer front, opposite a waste drawer opening, opposite an entry opening, or a combination thereof. The one or more port openings may be closed by one or more port caps. The chamber support may provide support for the chamber, a seal between the chamber and the waste cavity, an opening between the waste opening of the chamber and the waste bin, separation of one or more electrical components and the waste drawer, support for a drive mechanism, or any combination thereof. The chamber support may rest between a first shape and a second shape of the base frame. The chamber support may have a shape substantially reciprocal with a portion of a chamber. The chamber support may function as an isolated mount, such as described in U.S. Pat. No. 8,757,094 and US Patent Application Publication No. 2013/0333625, incorporated herein by reference.

The litter device includes a waste drawer. The waste drawer may function to collect waste, temporarily store waste, prevent malodors related to waste from exiting the device, or any combination thereof. The waste drawer may have any shape and size that allows the waste drawer to collect and temporarily store waste. The waste drawer may be located within a base, within a drawer cavity, between a chamber support and a bottom of a base, between a bottom of a base and the chamber, or any combination thereof. The waste drawer may be any size and/or shape such that it is able to temporarily collect and store waste. The waste drawer, or portions thereof, may have a three-dimensional shape which is substantially spherical, ovoidal, cylindrical, cuboidal, conical, pyramidical, the like, or any combination thereof. For example, a waste drawer may have a shape which is substantially cuboidal and hollow. The waste drawer may slide within a plane. The waste drawer may be removably located within the base. The waste drawer may be at least partially located within a waste drawer cavity. The plane may be parallel or offset relative to a horizontal plane. The waste drawer may include a waste bin, drawer front, step, handle, or any combination thereof. A drawer front may form all or a portion of a forward-facing surface (e.g., same side as an entry opening) of the base. A drawer front may align with an exterior of a base frame so as to conceal the drawer cavity. A drawer front may have a cross-sectional shape substantially reciprocal with a cross-sectional shape of a drawer opening in the base frame. A reciprocal shape may allow for the drawer cavity by the drawer front to be completely sealed when the waste drawer is located within the drawer cavity. The drawer front may be affixed, integral with, or both to a waste bin. The drawer front may be forward-facing relative to the waste bin.

The waste drawer may include a waste bin configured to retain used litter, waste, a waste bag, or any combination thereof. The waste bin may have a hollow interior. The hollow interior may define a volume of the waste bin. The volume of the waste bin may be suitable for retaining multiple days of waste, used litter, or both. The volume of the waste bin may be suitable for storing waste which accumulates over 1 day or more. 3 days or more. 5 days or more, or even 7 days or more. The volume of the waste bin may be suitable for storing waste which accumulates over 20 days or less. 15 days or less. 12 days or less, or even 10 days or less. The volume of the waste bin may be about 7.500 $cm^3$ or more, about 10,000 $cm^3$ or more, about 12.000 $cm^3$ or more, or even about 12.500 $cm^3$ or more. The volume of the waste bin may be about 50.000 $cm^3$ or less, about 40,000 $cm^3$ or less, about 30.000 $cm^3$ or less, about 20.000 $cm^3$ or less, or even about 15.000 $cm^3$ or less. The waste bin may include one or more seals. The one or more seals may allow for malodors to be retained with the drawer cavity, prevented from escaping outside of the litter device, or both. For example, the waste bin may include a rubber gasket about a periphery of an opening. The opening of the waste bin may be in fluid communication and/or alignment with an opening of a chamber support, may come into fluid communication and/or alignment with a waste opening, or a combination thereof. The opening of the waste bin may be in fluid communication with one or more filtering systems. The waste bin may be affixed to one or more steps and/or handles of the waste drawer.

The litter device may include one or more steps. The one or more steps may allow an animal to comfortably enter and exit the chamber via an opening. The one or more steps may have any size and shape that allows one or more animals to enter and exit the chamber via the opening. The one or more steps may be located on a same side of the device as an opening. The one or more steps may be part of the base, chamber, waste drawer, the like, or any combination thereof. The step may have any shape, size, and/or configuration to case entry and exit of an animal into the chamber, provide a handle for opening a waste drawer, cleaning excess litter from paws of an animal, or any combination thereof. The one or more steps may have a cross-sectional shape which is substantially circular, ovular, square, rectangular, trapezoidal, triangular, rhombus, the like, or any combination thereof. For example, a step may have a cross-sectional shape which is generally trapezoidal with rounded vertices. The cross-sectional shape may refer to a cross-section which is substantially parallel to a horizontal plane. One or more steps may extend outward, away, or both from a waste bin, drawer front, base frame, or a combination thereof. One or more steps may be permanently affixed to, removably affixed to, integral with, or both the waste bin, drawer front, base frame, or a combination thereof. One or more steps may be removable and/or affixed such that the one or more steps can be removed to dispose of litter and remnants collected in a hollow interior. The step may function as a handle. The step may include an indentation, groove, smaller thickness, or the like to provide a handle. The indentation, groove, or smaller thickness may be located opposite an upper surface which is used for the animal to step thereon. The upper surface, interior, or both may include a cleaning device. The step may be at least partially hollow. A hollow interior may allow for loose litter from a cleaning device to be collected.

The one or more steps may include a cleaning device. The cleaning device may function to remove litter remaining on feet (e.g., paws) of an animal when they exit the chamber, before completely leaving the litter device, or both. By removing litter from an animal's paws, the cleaning devices prevents litter and other unwanted remnants from an animal's paws being tracked throughout a region surrounding the litter device. The cleaning device may have any configuration which removes litter from an animal's paws, can be located on a step, is unobtrusive, or any combination thereof. A cleaning device may have a cross-sectional shape similar to that of the step. A cleaning device may have a shape reciprocal with at least a portion of an interior hollow portion of a step. A similar shape allows for the cleaning device to completely cover an upper surface of a step, be located within the step, or both. The one or more cleaning devices may have one or more surfaces which are contoured. Contoured may mean ribbed, grated, corrugated, slotted, the like, or any combination thereof. For example, a surface opposing the step may be corrugated and/or ribbed. A contoured surface may be beneficial in loosening litter, waste, and/or other debris from the paw of an animal; collecting the litter, waste, and/or other debris; or any combination thereof. For example, the peaks of a contoured surface may come in contact with the paws of an animal and aid in removal of the litter, waste, and/or other debris. For example, the valleys of the contoured surface may collect the litter, waste, and/or other debris. The one or more cleaning devices may include or be free of one or more openings. One or more openings may allow for litter to pass through, pass from the cleaning device into a hollow interior of a step, pass into an interior of the cleaning device, or a combination thereof. The one or more cleaning devices may include a mat, pad, screen, insert, the like, or a combination thereof. The one or more cleaning devices may be made of any material which can remove the litter, other unwanted remnants, or both; is able to withstand exposure to litter and animal waste; or a combination thereof. The cleaning device may be comprised of rubber, plastic, polymer, natural material, synthetic material, or a combination thereof. The cleaning device may be made from a same or different material as the remainder of the litter device. The cleaning device may be removable from a step. By being removable, the hollow interior can be exposed, such as for removing collected litter and remnants. The cleaning device may be secured via one or more fasteners or may be free of being secured with one or more fasteners. One or more fasteners may include one or more threaded fasteners (e.g., screw, bolt, nut), interlocking tabs, rivets, pins, the like, or a combination thereof. To avoid being attached by one or more fasteners, the cleaning device may rest atop a rim and/or flange of a step, within one or more supporting surfaces projecting from an inside of a step, or both. By avoiding the use of fasteners, removing the cleaning device may be quick and simple for a user.

The litter device may include a septum. The septum may function to sort waste from litter, separate used litter from unused litter, or both. The septum may have any size or shape suitable for being located within the chamber to sift through litter during a cleaning cycle. The septum may be a single piece or a plurality of pieces. The septum may include a screen portion, septum portion, hinge, or a combination thereof. The septum may be located within the chamber, affixed to an interior of the chamber (e.g., upper chamber), integral with the chamber, or any combination thereof. The septum may be located substantially across from a lower chamber, liner, or both. The septum may be aligned with a waste opening, partially through a waste opening, or both of the upper chamber. The septum portion may include a septum opening. The septum opening may be aligned, co-axial, centered, and/or even reside within a waste opening. The septum opening may be formed in a protrusion of a septum portion. A protrusion may create a funnel to guide waste through the waste opening into the waste drawer. The septum opening may be the hollow portion of the protrusion. The protrusion may be referred to as a neck. The protrusion (e.g., neck) may be located within the waste opening. The septum portion may be statically affixed to an interior of the chamber, such as the upper chamber. Thus, the septum portion may rotate with and remain fixed to the chamber during rotation. The septum may include a hinge. The hinge may connect a septum portion to a screen portion. The hinge may allow a septum portion, screen portion, or both the ability to move relative to the other during one or more cleaning cycles, rotation of a chamber, or both. The hinge may be affixed to, integral with, adjacent to, located between, or a combination thereof to the septum portion and screen portion. The hinge may be a multi-component hinge (e.g., butt hinge) or a single component hinge. A single component hinge may be a living hinge. The hinge may be made of any material which allows movement of the screen portion, septum portion, or both relative to the other. Movement may be during the forming process of the septum, before and/or during installation of the septum into the chamber, rotation of the chamber during a cleaning cycle, or any combination thereof. The hinge may also be formed such that it allows the screen geometry to be formed in the line of draw of the septum for molding. The hinge may be made of the same material as the screen portion, septum portion, or both. The hinge may allow for the screen portion to be angled relative to the septum portion. The hinge may allow for the septum to be installed and contour to a shape substantially reciprocal to an interior of the chamber. The hinge may impart flexibility to the screen portion relative to the septum portion. The screen portion, in a home position of the chamber, natural resting portion of the septum outside of the chamber, or both may be at an acute, perpendicular, or obtuse angle relative to the septum portion. The screen portion may be at an angle relative to the septum portion of about 90 degrees or greater, about 120 degrees or greater, about 140 degrees or greater, or even about 150 degrees or greater. The screen portion may be at an angle relative to the septum portion of about 180 degrees or less, about 170 degrees or less, or even about 160 degrees or less. The angle may be measured as the angle between the surfaces facing toward the litter bed, lower chamber, base, interior of the chamber, or any combination thereof. The screen portion may be free of attachment to the chamber. The screen portion may only be affixed to the chamber via the septum portion. The screen portion may move (e.g., swing) and/or remain substantially static relative to the hinge, septum portion, or both during a cleaning cycle, rotation of the chamber, or both. The screen portion may include one or more openings, such as a plurality of openings. The screen portion may be ribbed, grated, corrugated, slotted, meshed, the like, or any combination thereof. The plurality of openings may be sized such as to allow for unused (e.g., clean) litter to pass therethrough while waste, used litter, clumps, lumps, and/or the like are prevented from passing through. The plurality of openings in the screen portion may allow for litter to be sifted through during a cleaning cycle so as to separate waste from the unused litter. The septum may be comprised of a suitable material. The material may be non-stick; liquid impenetrable; resistant to damage, penetration, scent absorption, stain, or a combination thereof by litter, waste, liquids, solids, semi-solids, or a combination thereof. The septum material may be rubber, polymeric material, a synthetic material, a natural material, or any or a combination thereof. The septum may be made of the same material or differing materials. For example, the living hinge, septum portion, and screen portion may be comprised of the same one or more materials.

The litter device may include one or more seals. One or more seals may function to prevent odor from transferring from a base, waste drawer, or both to the chamber, about the chamber, an exterior of the litter device, or any combination thereof. The one or more seals may include any seals capable of forming a scaling a junction between two or more surfaces to prevent malodors, liquid, waste, and/or litter from passing therethrough. The one or more seals may include one or more mechanical seals. The one or more mechanical seals may include one or more adhesives, sealants, gaskets, compressing fittings, plugs, the like, or any combination thereof. One or more gaskets may include one or more flange gaskets. O-ring gaskets, brush seals, the like, or any combination thereof. The one or more seals may be located between one or more mating surfaces, at a junction of two or more surfaces, or both. The one or more seals may be part of the chamber, base, litter dispenser, ventilation system, the like, or any combination thereof. The one or more seals may be located between mating surfaces of a waste drawer and base. The one or more seals may be located between a mating surface of a waste bin and a chamber support. The one or more mating surfaces may be about a perimeter of the waste bin, opening of the chamber support, or both where the waste bin contacts the chamber support. One or more seals may be located between a chamber and a base. One or more seals may seal a gap between a chamber and a chamber support. One or more seals may be located between a base frame and a waste drawer. One or more seals may be located where a waste drawer mates with a drawer opening. One or more seals may be located about a perimeter of the drawer opening, a reciprocal portion of the waste drawer, or both. One or more seals may still allow movement for one or more components while preventing leakage while in a static position. The one or more seals may allow for the waste drawer to be removed from a base, chamber to rotate, or both. The one or more seals may be comprised of one or more seal materials. One or more seal materials may include rubber, silicone, metal, paper, cork, felt, neoprene, nitrile rubber, fiberglass, polytetrafluoroethylene (PTFE), plastic polymers such as polychlorotrifluoroethylene, the like, or a combination thereof.

The litter device may include a drive mechanism. The drive mechanism may function to rotate a chamber, drive a track, or both; produce movement of a cleaning cycle; or a combination thereof. The drive mechanism may be any suitable mechanism for rotating and/or engaging with a chamber, track, or both. The drive mechanism may be engaged, in rotational communication, or both with the track. The drive mechanism may include one or more cogs, pulleys, sprockets, gears, belts, direct drives, motors, drive shafts, the like, or any combination thereof. The drive mechanism may include a drive source. The drive source may convert electrical energy into mechanical energy. The drive source may be configured to be in electrical communication with a power source. A power source may be an outlet, direct current, alternating current, the like, or a combination thereof. A drive source may be a motor or other power supply. The drive source may be an electronic motor, pneumatic power supply, hydraulic power supply, another power supply, or a combination thereof. The drive source may transfer or produce torque in a drive shaft. The drive source may include a drive shaft. The drive shaft may receive torque from the drive source, output torque, or both. The drive shaft may be in communication with the drive source. The drive shaft may be rotationally affixed to the drive source. The drive source, drive shaft, or both may be in rotational communication with one or more gears. The drive source, drive shaft, or both may transfer torque and/or drive one or more gears. The one or more gears may be configured to engage and/or mate with a track. The one or more gears may transfer torque, drive, or both a track. The one or more gears may include a pinion, spur gear, helical gear, internal gear, the like, or a combination thereof. The drive mechanism may be comprised of materials which are resistant to moisture, vapor, fumes, and the like. Examples of materials that can be used are rubber, plastic, metal, ceramic, or a combination thereof. The drive mechanism may be partially or completely located within a base, base frame, chamber support, or a combination thereof. The drive mechanism may be physically separated from the drawer cavity such that litter and waste are prevented from coming into contact with the drive mechanism. The drive mechanism may reside in a pocket within the chamber support. The drive mechanism may reside in the chamber support on a side opposite of the waste drawer, a same side as the chamber, or both. The chamber support may be an isolated mount.

The automated litter device may include one or more sensors. The one or more sensors may function to detect one or more conditions of the device. The one or more sensors may be located in any one or more portions of the litter device which may allow for a sensor to detect the presence and/or absence of one or more conditions of the one or more components. One or more sensors may be located adjacent to an entry opening, in proximity and/or affixed to a drive source, near one or more pinch points, part of a bonnet, part of base, within or affixed to the chamber, or any combination thereof. One or more sensors may be located within or on a bezel. One or more sensors may be located adjacent to an entry opening, opposite the base, a same side of a chamber as a waste opening, same side of a chamber as an upper chamber, or any combination thereof. One or more sensors may be located on a sensor board within a bezel. The angle of the opening plane relative to a vertical plane may result in one or more sensors being located over the litter, having a line of sight into the litter, over a hollow interior of the chamber, having a line of sight in a hollow interior, or any combination thereof. Based on the one or more conditions sensed, one or more sensors may transit one or more signals to one or more controllers, processors, communication modules, computing devices, or any combination thereof. The one or more sensors may be a single sensor or a plurality of sensors. One or more sensors may include 1 or more, 2 or more, or even 3 or more sensors. One or more sensors may include 15 or less, 12 or less, 10 or less, 9 or less, 8 or less, 7 or less, or even 5 or less sensors. One or more sensors may be adapted to detect one or more conditions related to: a mass, change in mass, or both of the litter device; a presence of litter, the amount of litter, or both; a presence of waste, a level of waste, or both; the presence of light, light above, at, and/or below a lumen level, or a combination thereof; a connection between two or more components of the device (e.g., support base and bonnet); the presence of one or more pinch conditions; one or more positions of a chamber; an operating condition of a motor; presence of an animal within one or more portions of the litter device; or any combination thereof. One or more sensors may be adapted to sense the presence of an animal within a chamber, the presence of waste within a waste bin in a base, a level of litter in a chamber, a position of the chamber relative to the base, or any combination thereof. One or more sensors may be adapted to sense the presence of an animal within the litter device and within a portion other than the chamber. One or more sensors may be able to sense presence, measure distance, measure a displacement, detection a position relative to one or more components of the automated litter device, or any combination thereof. One or more sensors may include one or more mass sensors, capacitive sensors, infrared sensors, laser sensors, ultrasonic sensors, membrane sensors, radio frequency (RF) admittance sensors, conductive sensors, optical interface sensors, microwave sensors, the like, or combination thereof. One or more laser sensors may include one or more cone laser sensors. One or more cone laser sensors may include one or more wide cone laser sensors, narrow cone laser sensors, or both. The one or more sensors may include one or more waste sensors (e.g., indicator), presence sensors, light sensors, interlock sensors, pinch detectors, position sensors, motor sensors (e.g., one or more laser sensors, distance sensors,) or any combination thereof. One or more sensors may provide the function of multiple sensors. For example, one or more waste sensors may also be one or more presence sensors. One or more exemplary sensors may be discussed in U.S. Pat. No. 8,757,094; and US Patent Application Publication Nos. 2013/0333625 and 2019/0364840, incorporated herein by reference.

The litter device may include one or more waste sensors. The one or more waste sensors may function to detect a predetermined level, a real-time level, or both of waste, litter, or both (e.g., contents) within a waste drawer, chamber, or both. The one or more waste sensors may be located anywhere within the litter device such that the one or more waste sensors may sense a level of contents within a waste drawer. The one or more waste sensors may be located in and/or on a base, waste drawer, chamber, bezel, in proximity to an entry opening, or a combination thereof. The one or more waste sensors may include a single sensor a plurality of sensors. The one or more waste sensors may include 1 or more, 2 or more, or even 3 or more sensors. The one or more waste sensors may include 5 or less or even 4 or less sensors. For example, the one or more waste sensors may include a single sensor. As another example, the one or more waste sensors may include 2 sensors. As another example, the one or more waste sensors may include 3 sensors. The one or more waste sensors may be any type of sensor suitable for detecting, and/or monitoring a level of contents within a waste drawer. One suitable waste sensor is one or more laser sensors. Some suitable waste sensor and configurations may be that of one or more indicators as described in U.S. Pat. No. 9,433,185.

Exemplary combinations of one or more waste sensors may include two or more infrared sensors opposing one another, one or more laser beams, a laser beam sensor and infrared sensor combination, the like, or any combination thereof. One or more waste sensors may be located within, on, or in proximity to a waste drawer. Alternatively, or in addition, to sensing the presence of waste, one or more waste sensors may sense the presence of an animal at least partially within a waste drawer. One waste sensor may include a light beam transmitter and one waste sensor may include a light beam detector. The light beam transmitter may relay a light beam to the light beam detector such that the light beam is detected. A waste drawer may be indicated as at least partially full once the waste within the drawer interferes with the light beam, such that the light beam is no longer detected by the light beam detector. The presence of an animal within a waste drawer may be indicated when at least a portion of the animal interferes with the light beam, such that the light beam is no longer detected by the light beam detector.

Another example of a waste sensor may include one or more laser sensors affixed near an entry opening of the chamber, an interior upper surface of a bezel, an interior upper surface of the chamber opposite a waste drawer, or any combination thereof. The one or more waste sensors may be assembled to a bezel, located in a gap of a bezel, on a sensor mount of a bezel, part of a sensor board, or any combination thereof. The one or more laser sensors may include one or more cone laser sensors. One or more cone laser sensors may include a single or a plurality of cone laser sensors. One or more cone laser sensors may include one or more wide cone laser sensors, narrow cone laser sensors, or a combination thereof. As an example, the one or more waste sensors may include two wide cone laser sensors and one narrow cone laser sensor. As another example, the one or more waste sensors may include one narrow cone laser sensor. The one or more waste sensors may be arranged in proximity to one or more presence sensors. For example, the one or more waste sensors may be arranged on a same sensor board as one or more presence sensors. The one or more waste sensors may be arranged with one or more presence sensors to form an array (line), cross, triangle, square, circle, the like, or a combination thereof on a sensor board. For example, a waste sensor may be located between two presence sensors on the sensor board. The one or more laser sensors may be arranged to have a line of sight into a waste drawer. The one or more sensors may be located on an upper portion of a bezel (e.g., opposite a base) to have a line of sight into the chamber, the waste opening, or both. The line of sight may be enabled by an angle of the opening plane, rotational axis of the chamber, or both. The line of sight may be enabled by the size and shape of the entry opening. The one or more sensors may have a line a sight over a waste drawer, waste bin, opening of a chamber support, surface of a litter bed, or any combination thereof. The one or more laser sensors may have a line of sight onto a surface of a litter bed in a chamber when the chamber is in a home position. The one or more laser sensors may have line of sight into a waste bin when a waste opening is aligned with a waste drawer. The chamber may rotate such that the waste opening is aligned with the waste drawer. This alignment may occur during a cleaning cycle, when a chamber is in an emptying position, or both.

The litter device may include one or more presence sensors. The one or more presence sensors may function to monitor a mass in the litter device, such as a mass within the chamber; a presence of an animal within the litter device; a level of litter within the chamber; or any combination thereof. A presence sensor may continuously, intermittently, or both monitor a mass, presence, litter level, or any combination thereof. The presence sensor may be located at any location in the device so that any change in mass of the litter device, change in presence of an animal within the device, or both may be detected. The presence sensor may be located at a location in the device so that rotation of the chamber may be prevented if additional mass over a predetermined mass is located within the chamber, if an animal is detected within the chamber, or both. The predetermined mass may be a mass over a mass of litter within a unit, a mass set by a user, below a mass of an animal, or any combination thereof. The presence sensor may include one or more resistors, force sensors, switches, controllers, microprocessors, laser sensors, or a combination thereof. The one or more presence sensors may be located anywhere within the litter device such that the one or more presence sensors may detect the presence of an animal within the chamber, may detect a level of litter within the chamber, or both. The one or more presence sensors may be located in and/or on a base, chamber, bezel, in proximity to an entry opening, or a combination thereof. The one or more presence sensors may include a single sensor a plurality of sensors. The one or more presence sensors may include 1 or more, 2 or more, or even 3 or more sensors. The one or more presence sensors may include 5 or less or even 4 or less sensors. For example, the one or more presence sensors may include a single sensor. For example, the one or more presence sensors may include 2 sensors. As another example, the one or more presence sensors may include 3 sensors. The one or more presence sensors may be any type of sensor suitable for detecting the presence of an animal, the level of litter, or both. One suitable presence sensor is one or more laser sensors. An example of a suitable presence sensor and configuration within a litter device may be the mass sensor as described in U.S. Pat. No. 9,433,185.

One or more presence sensors may include one or more laser sensors affixed near an entry opening of the chamber, an interior upper surface of a bezel, an interior upper surface of the chamber opposite a waste drawer, or any combination thereof. The one or more waste sensors may be assembled to a bezel, located in a gap of a bezel, on a sensor mount of a bezel, part of a sensor board, or any combination thereof. The one or more presence sensors may include, be separate from, be the same as, be adjacent to, be in proximity to, or a combination thereof one or more waste sensors. The one or more laser sensors may include one or more cone laser sensors. One or more cone laser sensors may include a single or a plurality of cone laser sensors. One or more cone laser sensors may include one or more wide cone laser sensors, narrow cone laser sensors, or a combination thereof. One or more cone laser sensors may include two wide cone laser sensors, a single narrow cone laser sensor, or a combination thereof. For example, one or more presence sensors may include two wide cone laser sensors. As another example, one or more presence sensors may include two wide cone laser sensors and a narrow cone laser sensor. One or more of the presence sensors may also be or function as one or more waste sensors. For example, a narrow cone laser sensor may be both a presence sensor and a waste sensor. As an alternative, one or more presence sensors may not function as waste sensors. The one or more presence sensors may be arranged in proximity to one or more waste sensors. For example, the one or more presence sensors may be arranged on a same sensor board as one or more waste sensors. The one or more presence sensors may be arranged with one or more waste sensors to form an array (line), cross, triangle, square, circle, the like, or a combination thereof on a sensor board. For example, two presence sensors may have a waste sensor therebetween. The one or more laser sensors may be arranged to have a line of sight into an interior of the chamber, across an entry opening, over all or a majority of an upper surface of a litter bed, or any combination thereof. The line of sight may be enabled by an angle of the opening plane, rotational axis of the chamber, or both. The line of sight may be enabled by the size and shape of the entry opening. The one or more sensors may have a line of sight onto a majority of an exposed surface of the litter. The line of sight over the exposed surface may allow for the one or more sensors to detect a presence of an animal in most any part of the chamber, the litter level, or both. The line of sight over the majority of the exposed surface may allow for accounting for an uneven surface of the litter. The presence sensor may sense the presence of an animal entering and/or exiting the chamber by a beam breaking at an entry opening, a laser breaking above an upper surface of a litter bed, and/or the like.

The one or more cone laser sensors may have a sensing range of 0.1 m or greater, 0.2 m or greater. 0.3 m or greater, or even 0.5 m or greater. The one or more cone laser sensors may have a sensing range of 5 m or less, 4 m or less, 3 m or less, 2 m or less, or even 1 m or less. The one or more cone laser sensors may have a sensing range suitable from sensing a distance approximately equal to a height or less than a height of the litter device. A height of the litter device may be measured from the surface upon which the device rests to the opposing exterior surface of a bonnet. It may be beneficial to have one or more cone laser sensors with a sensing range which suitable from sensing from a sensor board to a bottom of a waste drawer. The one or more cone laser sensors may operate at a frequency suitable for detecting the presence of an object distanced from the sensor itself. The one or more cone laser sensors may have a ranging frequency of about 1 Hz or more, 10 Hz or more, 30 Hz or more, 40 Hz or more, or even 50 Hz or more. The one or more cone laser sensors may have a ranging frequency of about 300 Hz or less, about 200 Hz or less, about 150 Hz or less, about 100 Hz or less, or even about 75 Hz or less. The one or more cone laser sensors have a field of view which is substantially cylindrical, conical, or both. A conical field of view may be advantageous as it provides a wider viewing range across a surface of a litter bed, within a waste drawer, across an interior of a chamber, or any combination thereof. A conical field of view may be about 5 degrees or more, about 10 degrees or more, about 15 degrees or more, about 20 degrees or more, or even about 25 degrees or more. A conical field of view may be about 150 degrees or less, about 120 degrees or less, about 100 degrees or less, about 75 degrees or less, or even about 60 degrees or less. A wide cone laser sensor may have a larger field of view than a narrow cone laser sensor. A narrow cone laser sensor may have a field of view of about 5 degrees or more, 7 degrees or more, 10 degrees or more, or even 12 degrees or more. A narrow cone laser sensor may have a field of view of about 25 degrees or less, about 20 degrees or less, about 17 degrees or less, or even about 15 degrees or less. For example, a narrow cone laser sensor may have a field of view of about 5 degrees to about 15 degrees. A wide cone laser sensor may have a field of view of about 20 degrees or more, about 25 degrees or more, about 30 degrees or more, or even about 35 degrees or more. A wide cone laser sensor may have a field of view of about 100 degrees or less, about 75 degrees or less, about 50 degrees or less, or even about 40 degrees or less. For example, a wide cone laser sensor may have a field of view of about 20 degrees to about 50 degrees, or even about 25 degrees to about 40 degrees. One or more cone laser sensors may include one or more Time-of-Flight (TOF), laser-ranging sensors. A suitable sensor for one or more cone laser sensors may include the Time-of-Flight sensor VL53L1X by STMicroelectronics.

The litter device may include one or more position sensors. The one or more position sensors may monitor a position of a chamber. A position of a chamber may be a home position, emptying position, any position therebetween, a position during a cleaning cycle, or any combination thereof. The one or more position sensors may be any sensor that may detect a position of a chamber relative to a base, a waste drawer, a bonnet, or any combination thereof. The one or more sensors may include one or more Hall effect sensors, laser sensors, the like, or a combination thereof. One or more exemplary position sensors and configurations within a litter device may be as described in U.S. Pat. No. 9,433,185. The one or more position sensors may include, be the same as, be separate from, be adjacent to, be in proximity to, or a combination thereof one or more waste sensors, presence sensors, or a combination thereof. The one or more laser sensors may detect rotation of a chamber. The one or more laser sensors may remain steady and/or static relative to a chamber during a cleaning cycle. The one or more laser sensors may be affixed near an entry opening of the chamber, an interior upper surface of a bezel, an interior upper surface of the chamber opposite a waste drawer, or any combination thereof. The one or more laser sensors may include one or more cone laser sensors. One or more cone laser sensors may include one or more wide cone laser sensors, narrow cone laser sensors, or a combination thereof.

The litter device may include one or more light sensors. The one or more light sensors may function to detect a light level within the litter device, about the outside surface of the litter device (e.g., ambient light), or both. The one or more light sensors may be any sensor suitable for detecting light within the litter device, outside of the litter device, or both. The one or more light sensors may be any sensor suitable for detecting a light reading below a predetermined lumen level. The one or more light sensors may be in direct or indirect connection with one or more lights. Reading of a light level below a predetermined lumen level may cause one or more lights within the litter device to turn on. The one or more light sensors may cooperate with one or more other sensors, such as a mass (e.g., presence) sensor. One or more lights within the litter device may turn on if a light level below a predetermined lumen level is detected by one or more light sensors and a mass above a predetermined mass level is detected by one or more mass sensors. Exemplary suitable light sensors and configurations within a litter device may be as described in U.S. Pat. No. 9,433,185.

The litter device may include one or more interlock sensors. The one or more interlock sensors may detect a connection, broken connection, or both between a bonnet and a support base. The one or more interlock sensors may detect if one or both sides, retaining clips, or both are partially removed, completely removed, or both. The one or more interlock sensors may sense power being supplied or not supplied to a bonnet through one or more connection points to the support base. The one or more interlock sensors may include one or more low current electrical sensors. One or more exemplary interlock sensors and configurations within a litter device may be as described in U.S. Pat. No. 9,433,185.

The litter device may include one or more pinch detectors. The one or more pinch detectors may detect the presence of one or more pinch conditions. The one or more pinch detectors may be located anywhere within the litter device suitable for detecting one or more pinch conditions. The one or more pinch detectors may be located proximate to any pinch points within the litter device. One or more pinch detectors may be located within a litter device so that a pinch detector is contacted before an edge of the chamber, the waste opening, the support base, the bonnet, the waste drawer, any other components of the litter device, or a combination thereof. One or more exemplary pinch detectors and configurations within a litter device may be as described in U.S. Pat. No. 9,433,185.

The litter device may include one or more motor sensors. The one or more motor sensors may monitor functionality of one or more drive sources located within the litter device. The one or more motor sensors may be any sensor which may detect a position, torque, temperature, speed, the like, or any combination thereof of one or more drive sources (e.g., motor) within the litter device. The one or more sensors may include one or more position sensors, laser sensors, torque sensors, temperature sensors, speed sensors, the like, or any combination thereof. The one or more motor sensors may detect one or more operating conditions of a drive source. One or more operating conditions may include position, torque, temperature, speed, the like, or a combination thereof of the one or more drive sources. The one or more motor sensors may cooperate with one or more processors and/or controllers to compare one or more detected operating conditions to one or more pre-determined operating conditions. One or more pre-determined operating conditions may be the operating condition values determined as suitable for the one or more drive source. If a detected operating condition is outside the range of an acceptable pre-determined operating condition, a cleaning cycle may be prevented, the litter device may send an alert to a user, and/or the like.

The automated litter device may include one or more controllers. The one or more controllers may function to receive one or more signals, transmit one or more signals, control operations of one or more components of the litter device, or a combination thereof. The one or more controllers may be in communication with one or more sensors, drive mechanisms, control panels, user interfaces, the like, or any combination thereof. The one or more controllers may be adapted to receive, transmit, or both one or more signals from the one or more sensors, drive mechanisms, control panels, user interfaces, the like, or a combination thereof. The one or more controllers may reside within or be in communication with the litter device. The one or more controllers may be located within or affixed to a base, chamber, or both. The one or more controllers may include one or more controllers, microcontrollers, microprocessors, processors, storage mediums, or a combination thereof. One or more suitable controllers may include one or more controllers, microprocessors, or both as described in U.S. Pat. Nos. 8,757,094; and 9,433,185.

Cleaning Cycle

The litter device may complete one or more cleaning cycles. A cleaning cycle may function to transfer waste from within a chamber into a base, waste drawer, or combination thereof. A cleaning cycle may function to sort clean litter (e.g., unused litter) from waste, used litter, clumps, lumps, or any combination thereof. A cleaning cycle may be initiated after one or more presence sensors sense an animal has exited the chamber, waste has been deposited within the chamber, a user has initiated a cleaning cycle, or any combination thereof. A cleaning cycle may begin with rotation of a chamber. A chamber may be driven by a track, drive mechanism, or both. A chamber may be driven by a track affixed thereto. The track may be driven by a drive mechanism. The chamber may rotate clockwise, counter-clockwise, or both. Rotation direction may be determined by the location of the septum, the screen portion relative to the septum portion, a waste opening, or a combination thereof. During a cleaning cycle, the chamber may rotate from a home position to an emptying position, from an emptying position to a home position, from an emptying position to a leveling position, from a home position to a leveling position, from a leveling position to a home position, or any combination thereof. For example, a cleaning cycle may comprise rotation of the chamber from a home position to an emptying position, from the emptying position to a leveling position, and from the leveling position back to the home position. Rotation from the emptying position to the leveling position may include passing the home position. The home position may be a resting position of the chamber suitable for an animal to use the litter device. The emptying position may allow for waste to transfer to a waste drawer. In the emptying position the waste opening may be aligned with the waste drawer. The leveling position may allow for litter to level itself along a bottom chamber, liner, or both before returning to a home position.

Rotation of the chamber may be about the rotational axis of the chamber. The chamber may rotate during a cleaning cycle by about 10 degrees or more, 20 degrees or more, 30 degrees or more, about 50 degrees or more, about 90 degrees or more, about 100 degrees or more, about 180 degrees or more, about 205 degrees or more, about 245 degrees or more, or even about 270 or more. The chamber may rotate by about 540 degrees or less, about 500 degrees or less, about 400 degrees or less, or even about 360 degrees or less. The chamber may rotate in a single direction or two directions about the rotational axis. The chamber may rotate in a first direction, second direction, or both. The first direction may be counterclockwise, clockwise, or both. The second direction may be clockwise, counterclockwise, or both. The second direction may be opposite the first direction. Clockwise and counterclockwise may be determined by facing toward the entry opening from outside of the litter device. The chamber may rotate in either direction a single time or a plurality of times. The chamber may rotate in a first direction and then a second direction. The chamber may rotate in a second direction and then a first direction. The chamber may rotate in a first direction then a second direction and again in a first direction. The chamber may rotate in a first direction from a home position to and/or past an emptying position, from an emptying position toward a home position, from a leveling position to a home position, or a combination thereof. The chamber may rotate in a second direction from an emptying position to and/or past a home position, from the emptying position to a leveling position, from a home position to a leveling position, or any combination thereof. For example, the chamber may rotate in a first direction from a home position to an emptying position, then in a second direction from an emptying position to a leveling position (e.g., past the home position), and then in the first direction from the leveling position back to the home position. For example, the chamber may rotate between about 160 degrees and about 220 degrees, or even between about 180 degrees and 210 degrees, in a first direction from a home position to an emptying position. For example, the chamber may rotate about 170 degrees to about 265 degrees, or even between about 200 degrees and 245 degrees, in a second direction (e.g., opposite as first direction) from an emptying position to a leveling position. For example, the chamber may rotate about 10 degrees to about 45 degrees, or even about 20 degrees to about 40 degrees, in a first direction from a leveling position to a home position. An example of how the chamber may rotate may be described in U.S. Pat. No. 8,757,094 and US Patent Application Publication No. 2013/0333625, incorporated herein by reference. Another exemplary explanation of how a cleaning cycle may function may also be found in US Patent Application Publication No. 2019/0364840, incorporated herein by reference.

During a cleaning cycle, a septum may sift through the litter within the chamber. The septum may divide unused litter from waste. During a cleaning cycle, rotation of the chamber may result in the septum rotating towards the litter. The screen portion of a septum may lead while the septum portion of the septum may trail toward the litter.

During the beginning of a cleaning cycle, the chamber may rotate counterclockwise, in a first direction, from a home position to an emptying position, or any combination thereof. During this rotation, the waste opening and septum may move closer to the waste drawer. Due to gravity, the litter may come into contact with the septum. The litter may first come into contact with the screen portion. Upon contact with the litter, the screen portion may initially be located between the litter and the inner wall of the chamber. As the screen portion moves toward and into the litter, the screen portion may sift through the litter and separate waste and other large particles from the unused litter. Clean, unused litter may pass through the plurality of openings of the screen portion toward an inner wall of the chamber. Waste and other large particles remain on a side of the screen portion facing toward the interior of the chamber. As the chamber continues to rotate in the first direction, the waste transfers (e.g., slides across) from the screen portion to the septum portion due to gravity. When the waste opening and septum opening align with the waste bin in an emptying position, the waste may be funneled from resting on the septum portion toward the septum opening, then through the septum opening and waste opening, and then into the waste bin. During the cleaning cycle, by separating the waste from the unused litter, the waste may be able to be funneled toward the septum opening, waste opening, or both for disposal into a waste drawer while unused litter may be able to be reused.

After the cleaning cycle reaches the emptying position, the chamber may rotate in a second direction, opposite the first direction, clockwise, from an emptying position toward a home position, from an emptying position to a leveling position, or any combination thereof. As the chamber may rotate in the second direction, the litter (e.g., unused litter) may move toward the screen portion of the septum. As the chamber rotates in the second direction, the litter (e.g., unused litter) may move under the screen portion, between the screen portion and an inner wall of the chamber, through a plurality of openings of the screen portion, or any combination thereof. As the chamber rotates in the second direction, the litter may move back to rest on a lower portion of the chamber (e.g., lower chamber, liner, or both).

During a cleaning cycle, the chamber may rotate in a second direction toward a leveling position, past a home position toward a leveling position, or both. The leveling position may allow for the litter to level itself on the lower chamber, liner, or both. The leveling position may allow for the litter to overcome surface friction with the liner, inner wall of the chamber, or both. The leveling position may allow for the litter to return to an angle of repose.

During a cleaning cycle, the chamber may then rotate in a first direction from the leveling position back to a home position. Returning to the home position may allow for an animal to once again use the litter device.

The septum may function as described in U.S. Pat. No. 8,757,094 and US Patent Application Publication No. 2013/0333625, incorporated herein by reference.

Filter System

The present teachings also relate to a filtering system. The filtering system may function to prevent, reduce, neutralize, and/or even eliminate odor from air passing therethrough from the litter device. The filtering system may have any size, shape, and/or configuration for reducing or even eliminating malodor associated with animal waste. The filtering system may be an active system, passive system, or both. An active system may be one that moves air to reduce or eliminate odor. A passive system may be one that absorbs malodor. The reduction of malodor may occur through eliminating bacteria causing the odor, filtering the odor, cooling the air to reduce the odor, or any combination thereof. The filtering system may include one or more air circulation devices, filters, light treatment devices, heat exchange devices, the like, or a combination thereof. One or more light treatment devices may be any energy source suitable for killing bacteria waste which causes a malodor. A suitable light treatment device may include one or more ultraviolet lights. One or more heat exchange devices may function to change an air temperature of air within a filtering system, such as reducing the air temperature. Cooling the air may suppress growth of bacteria associated with malodors. One or more heat exchange devices may include one or more thermoelectric devices (TED). One or more thermoelectric devices may include one or more Peltier devices. One or more filters may include one or more physical filters. One or more physical filters may be any filter suitable for absorbing malodor from air as the air passes through the filter. One or more physical filters may include zeolite, charcoal, nylon wool, synthetic wool, silica gel, baking powder, the like, or a combination thereof. The filtering system may be part of the litter device, affixed to the litter device, within the litter device, part of an exterior of the litter device, or any combination thereof. A filtering system may be located between a chamber and a base, adjacent to a base, within the base, part of the chamber, outside of the base, outside of the chamber, or any combination thereof. The filtering system may be affixed to the chamber, the base, or both. The filtering system may be located generally opposite a waste opening of a chamber, adjacent to a waste bin, opposite a waste drawer opening, outside of the base, adjacent to an exterior wall of a base frame, or any combination thereof. The filtering system may be free of, may include, be part of, or combination thereof a ventilation system. The filtering system may include one or more housings, physical filters, caps, ventilation systems, ducts, the like, or any combination thereof.

The filtering system may include one or more housings. The one or more housings may function to house one or more components of the filtering system, be affixed to one or more components of the filtering system, be in fluid communication with the waste cavity and/or waste drawer, or a combination thereof. The housing may have any size, shape, and or configuration suitable for housing one or more components of the filtering system. The housing may be located within the litter device, outside of the litter device, affixed to the litter device, or any combination thereof. The housing may be affixed to a chamber, base, one or more ducts, or any combination thereof. The housing may be part of or separate from the chamber, base, or both. The housing may be formed in the chamber. The housing may be formed as an indentation within an exterior wall of the chamber. The housing may be referred to as a filter cavity. The housing may be formed in a lower chamber. The housing may be located adjacent to a waste drawer, waste bin, opening of a chamber support, or any combination thereof. While the chamber is in a home position, the housing may be in fluid communication with the waste bin so as to allow the malodors to flow from the waste bin to the housing. The indentation may provide a hollow void to store one or more physical filters. A physical filter may have a shape substantially reciprocal with the hollow void, filter cavity, contour of a portion of the chamber, or any combination thereof. The housing may include a cap. The cap may close off the indentation and retain the filter within the housing. The cap may include a plurality of openings. The plurality of openings may allow for malodors from a waste drawer to enter into the housing and be absorbed by one or more physical filters. The housing may be formed outside of the litter device. The housing may be any suitable shape for being located beside and/or adjacent to the base of the litter device. The housing may be in fluid communication with the base by one or more ducts.

The litter device may be affixed to and/or include a ventilation system. The ventilation system may function to circulate air through one or more filtering systems, filters, or both. The ventilation system may have any size, shape, and/or configuration for ventilating air from a waste drawer, base, or both of a litter device; directing air toward a filtering system; directing air from a filtering system toward a litter device; or any combination thereof. The ventilation system may include one or more ducts, inflows, outflows, ports, air circulation devices, housings, or any combination thereof. The one or more air circulation devices may be located within, separate from, or both the housing of the filtering system. The one or more air circulation devices may include one or more fans, air pumps, the like, or any combination thereof. The one or more air circulation devices may move air from, to, or both one or more ducts. The one or more air circulation devices may be located in one or more exterior walls, within an interior, or both of a housing, duct, or any combination thereof. The ventilation system may be connected to a part of a litter device by the one or more ducts. The ventilation system may be one or more ducts.

The ventilation system may include one or more ducts. The one or more ducts may function to provide a passageway for and/or guide air to and/or from the litter device, to and/or from a filtering system, or any combination thereof. The one or more ducts may provide an outflow, inflow, or both. The one or more ducts may have any shape, size, and/or configuration to be affixed to a base, filtering system, housing, the like, or a combination thereof. The one or more ducts may include a single duct or a plurality of ducts. The one or more ducts may include an inflow, outflow, or both. An outflow may receive air from a base, waste drawer, or both. An outflow may deliver air into a housing, filtering system, an exterior environment, or a combination thereof. An inflow may receive air from a housing, filtering system, or both. An inflow may deliver air into a base, waste drawer, an exterior environment, or any combination thereof. The one or more ducts may be in fluid communication with the base, waste drawer, or both via one or more ports. A duct may be connected to a base via one or more ports. A duct may be located within, affixed to, or both a port. The one or more ducts may provide a closed loop ventilation system, an open loop ventilation system, or both. In a closed loop ventilation system, air is continuously circulated internal to the filtering system and litter device. In an exemplary closed loop ventilation system, air is circulated from the base, waste drawer, or both to an outflow duct; from the outflow duct to a housing for filtering; from a housing to an inflow duct; and from the inflow duct to the waste drawer. In an open loop ventilation system, air is delivered to an exterior environment, the ventilation system may not recirculate air into the litter device, or both. An exterior environment may be any environment physically outside of the litter device (e.g., ambient environment), the outdoors, or both. To allow for ventilation to the outdoors, one or more ducts may connect to one or more window openings, door openings, or even vent openings of a facility, such as a residential home. An open loop ventilation system may or may not include a filtering system. An open loop ventilation system may include a filtering system such that malodors are not released into an outdoor or ambient environment. In an exemplary open loop ventilation system, air moves from the base, waste drawer, or both toward to an outflow duct; from the outflow duct to a housing for filtering; from a housing to an inflow duct; and from the inflow duct to an ambient or outdoor environment.

Litter Dispenser

The present teachings further relate to a litter dispenser. A litter dispenser may function to store clean, unused litter; refill a litter device, a chamber, or both with clean and unused litter; extend the usability of a litter device without human intervention; or any combination thereof. The litter dispenser may have any size, shape, and/or configuration to be in fluid communication with an interior of a chamber; affixed to a litter device, base, bonnet, chamber, or any combination thereof; have the ability to transfer a portion of litter stored therein into a chamber; have the ability to store litter; or any combination thereof. The litter device may include, be affixed to, or be free of a litter dispenser. The litter dispenser may be located generally opposite an entry opening. By being opposite the entry opening, the litter dispenser may not interfere with entry and exit by an animal, functionality with a septum and/or liner, or a combination thereof. The litter dispenser may be particularly useful in extending the usability of a litter device without human intervention. For example, a waste drawer may have a waste storage capacity greater than the litter capacity in the chamber. Capacity may be measured in volume, usage frequency by an animal, or even days. As during a cleaning cycle, used litter is transferred into the waste drawer along with animal waste, over time the usable litter may be depleted. The usable litter in the chamber may be depleted before the waste drawer is full. Traditionally, a human would have to intervene and refill the chamber with fresh litter for continued use of the litter device by an animal. The litter dispenser may be particularly advantageous in reducing human intervention with the litter device. The litter dispenser may automatically deliver clean, unused litter into the chamber. The litter dispenser may deliver litter into the chamber once the litter within the chamber reaches a certain quantity (e.g., volume, height, etc.). The level of litter within the chamber may be sensed by one or more sensors. For example, one or more presence sensors, waste sensors, or both may sense the quantity of litter within the chamber. The litter stored within the litter dispenser may be any kind of litter suitable for use with the litter device. The litter dispenser may include a hopper, lid, dispenser housing, dispensing device, the like, or any combination thereof.

The litter dispenser includes a hopper. The hopper may function to retain litter, a plurality of chamber volumes of litter, guide litter toward a dispensing housing and/or dispensing device, or any combination thereof. The hopper may have a shape which is generally cubical, cylindrical, spherical, conical, prismed, cuboidal, the like, or any combination thereof. For example, the hopper may have a shape which is generally a trapezoidal prism, conical, or the like. A shape may have a larger cross-sectional area adjacent to a rim and/or lid as compared to a smaller cross-sectional area closest to a dispensing device. A shape of the hopper may be tapered. Tapering, and/or a reduced cross-sectional area may aid in funneling of litter toward a dispensing device. The hopper may include a single or a plurality of side walls (e.g., hopper walls). One or more side walls may include a shape reciprocal with one or more contours of an exterior of a bonnet, chamber, or both. For example, a side wall adapted to be adjacent to a bonnet may be concave. The concave wall may match a convex and/or rounded shape of an exterior wall of a bonnet. The reciprocal shape may allow the side wall to rest directly adjacent to and in contact with the bonnet. The side walls may surround a hollow interior of the hopper. The side walls may be affixed to and/or integral with a bottom wall of the hopper. The bottom wall may further define a hollow interior of the hopper. A bottom wall of the hopper may be opposite an opening, rim, lid, or any combination thereof. The bottom wall may be partially or completely disposed within a dispenser housing. The bottom wall may be generally planar, sloped, or a combination thereof. The bottom wall may have a shape which is substantially conical, pyramidical, the like, or a combination thereof. The bottom wall may slope toward a funnel, an opening, a dispenser housing, a dispensing device, or a combination thereof. The bottom wall may slope away from an opening, rim, lid, or any combination thereof.

The litter dispenser may include a lid. The lid may function to protect litter within the litter dispenser, restrict access into the hopper, allow temporary access into the hopper, or any combination thereof. The lid may be removably affixed to a hopper. The lid may rest atop the hopper, partially in the hopper, or both. The lid may partially rest in the hopper adjacent to the rim. The lid may be secured to the hopper via one or more attachments. The one or more attachments may include a friction fit, snap fit, locks, lock tabs, biasing devices, the like, or any combination thereof. For example, a perimeter of the lid may have a snap fit with a perimeter (e.g., rim) of the hopper. As another example, the lid may include one or more locks which latch the lid to the hopper. The one or more biasing devices may include one or more springs. A perimeter of the lid may fit partially or completely within an inside of the perimeter of the hopper. The perimeter may be defined, at least partially, by a rim about an opening. By the lid resting within the hopper and/or using one or more attachments to secure the lid, a peripheral edge of the lid is not able to be accessed. Accessibility may refer to an animal or child trying to lift the cover by a peripheral edge with their teeth, paws, hands, and/or the like, such as out of curiosity. By reducing accessibility, one or more animals or humans may be prevented from accidentally or intentionally lifting the lid. The lid may have a cross-sectional shape substantially similar to a cross-sectional shape of the hopper. The cross-sectional shape may refer to one taken substantially perpendicular to a longitudinal axis of the hopper, horizontal plane of the litter device, or both. The cross-sectional shape of the lid may be square, rectangular, trapezoidal, elliptical, circular, crescent, triangular, the like, or a combination thereof. The lid may include an outer lid, inner lid, or both. An outer lid and inner lid may cooperate together to form a lid, house one or more attachments, or both. The cover may be located opposite and/or adjacent to one or more walls of the hopper. The lid may be located generally opposite a bottom wall. The lid may include a handle.

The lid may include a handle. The handle may function to facilitate removal of a lid, placement of a lid, or both. The handle may be integral with or affixed to any portion of the lid. The handle may be included as part of an outer lid. The handle may be centered or off-center relative to the lid. The handle may be centered to allow for cooperation within one or more attachments. The handle may have any suitable shape allowing for placement, removal, or both of a lid from the hopper. The handle may be formed by one or more indentations, projections, or both in the lid. The lid may be formed by opposing indentations. The indentations may have any suitable shape for allowing gripping of a handle body. The indentations may have a cross-sectional shape which may be substantially D-shaped, rectangular shaped, trapezoidal shaped, the like, or a combination thereof. The cross-sectional shape may be taken at a cross-section substantially perpendicular to a longitudinal axis, horizontal plane, or both. A handle body may be a surface of the lid located between the indentations, projections, or both. As an example, opposing indentations may be distanced from one another to form a handle body therebetween. The lid may be held in place by one or more latches.

The lid may include one or more locks. The one or more locks may be any lock suitable for retaining a lid in place, preventing an animal from removing the lid, allowing a user to intentionally remove and re-affix the lid, or a combination thereof. The one or more locks may be located in the lid, the hopper, or both. The one or more locks may include one or more deflectable tabs with a snap fit; one or more spring-based locks; one or more threaded locks; the like; or a combination thereof. For example, the one or more locks may include a pinch-grip lock having one or more biasing devices. A pinch-grip lock may include one or more lid latches. The one or more lid latches may reside at least partially within the cover, between an outer lid and inner lid, or both. The one or more lid latches may project outside of the cover and engage with the hopper. The one or more lid latches may engage one or more latch retainers formed in one or more side walls of the hopper. The one or more retainers may be one or more openings, indentations, or both. The one or more latch retainers may be biased into the one or more latch retainers by one or more biasing devices. One or more biasing devices may be any device suitable for biasing the lid latches toward the retainers, have the ability to retract the latches for the retainers, or both. The one or more biasing devices may include one or more springs. For example, a spring may be located between two opposing lid latches. The spring may be compressed to allow the lid latches to disengage with the retainers. The spring may expand in a relaxed state to bias the lid latches into the retainers. The one or more locks may be located opposite a dispensing device.

The litter dispenser may include a dispensing device. The dispensing device may function to segregate a portion of the litter from the hopper; retain litter within the litter dispenser; transfer a portion of the litter from the hopper to the dispenser housing, chamber, or both; or a combination thereof. The dispensing device may be located in any portion of the litter dispenser suitable for segregating litter from a hopper and transferring litter to a dispenser housing, chamber, or both. The dispensing housing may be located between a hopper and a chamber, within a dispenser housing, or both. The dispensing device may be configured to dispense a predetermined amount of litter from the hopper to the chamber. The dispensing device may include a drive source, drive shaft, hub, insert, paddle, the like, or a combination thereof. The dispensing device may be configured to rotate in a single direction, plurality of directions (e.g., first and second directions opposing one another), or both. The dispensing device may have a resting mode, refill mode, or both. A resting mode may be the dispensing device held in a static position to retain litter within the litter dispenser. A refill mode may be the dispensing device moving during a refill cycle to transfer litter from the hopper to the chamber. A refill cycle may be the time period which the dispensing device is moving to transfer a desired amount of litter into the chamber.

The dispensing device may include a drive source. A drive source may function to apply one or more dispensing forces, apply one or more return forces, move a dispensing device between one or more resting positions to one or more dispensing positions, or a combination thereof. A drive source may be in rotational communication with a drive shaft, hub, insert, paddle, or a combination thereof. A drive source may drive a drive shaft, hub, insert, paddle, or a combination thereof. The drive source may apply a first direction of torque, a second direction of torque, or both to a drive shaft, hub, insert, paddle, or a combination thereof. A drive source may be a motor or other power supply. The drive source may be an electronic motor, pneumatic power supply, hydraulic power supply, another power supply, or a combination thereof. The drive source may be in electronic communication with one or more power sources. The drive source may be in electronic communication with one or more sensors of the litter device. The drive source may be in communication with one or more presence sensors. The one or more presence sensors may detect a level of litter within the chamber. If the level of litter detected is below a required amount of litter, the drive source may initiate rotation of a drive shaft, hub, paddle, fins, or any combination thereof.

The dispensing device may include a drive shaft. A drive shaft may function to transfer torque from a drive source to a hub, insert, paddle, or combination thereof. The drive shaft may be in rotatable communication with a drive source, hub, insert, paddle, or any combination thereof. The drive source may rotate the drive shaft. By applying a first direction of torque, the drive shaft may rotation in a first direction. By applying a second direction of torque, the drive shaft may rotate in a second direction. The drive shaft may pass through a hub, insert, paddle, or combination thereof. The drive shaft may be directly or indirectly engaged with the hub, insert, paddle, or a combination thereof. For example, the drive shaft may be rotationally engaged with and received within a hollow interior of a hub. The drive shaft may have a friction fit, keyed fit, or the like with a hub. The drive shaft may have one or more engagement features which engage one or more mating engagement features of a hub, insert, paddle, or any combination thereof. For example, the drive shaft may include one or more surfaces reciprocal with one or more surfaces of a hollow interior of a hub. The drive shaft may have a flat surface and a rounded surface about its periphery which align with a reciprocal flat surface and rounded surface of a hollow interior of the hub.

The dispensing device may include a hub. The hub may function to rotationally engage the paddle with a drive source and/or drive shaft, rotate a paddle, or both. The hub may be located between a hopper and a chamber, within a dispenser housing, or both. The hub may be located within a dispenser cradle, adjacent to a dispensing opening, between a funnel opening and a dispensing opening, or a combination thereof. The hub may have any suitable shape for cooperating with a drive source, a drive shaft, an insert, a paddle, or a combination thereof. A hub may have a shape which is generally cubical, cylindrical, spherical, conical, prismed, cuboidal, the like, or any combination thereof. A hub may be hollow, partially hollow, solid, or a combination thereof. The hub may have a hollow interior. The hub may have a shaft cavity formed therein. The shaft cavity may extend from one end partially or completely to the opposing end of the hub. The shaft cavity may be generally centered with the overall dispenser, hub, or both. The shaft cavity may have a shape reciprocal with that of a drive shaft. The shaft cavity may include one or more engagement features which engage with, mesh, or match with one or more engagement features of a drive shaft. The hub may be configured to at least partially rotate in one or more directions, such as when driven by a drive source, drive shaft, or both. One or more directions may be opposing directions, a first direction, a second direction, or a combination thereof. A rotational axis of the hub may be co-axial, concentric, or off-center with a rotational axis of a drive source, drive shaft, or any combination thereof. A rotational axis may extend through the shaft cavity. A paddle may extend about a hub. The paddle may be integral with or affixed to the hub. The hub may have one or more paddle engagement features. The one or more paddle engagement features may function to mate with a paddle, fins of a paddle, or both. The one or more paddle engagement features may include one or more channels, slots, brackets, hinges, the like, or any combination thereof for allowing attachment of one or more paddles, fins, both to the hub. One or more channels may be formed along at least a portion of or all of a length of the hub. One or more channels may include 1 or more. 2 or more. 3 or more. 4 or more, or even 5 or more channels. One or more channels may include 10 or less. 8 or less, or even 7 or less channels. The number of channels may be equal to the number of fins in a paddle. One or more channels may be formed along an exterior surface of the hub about the shaft cavity. One or more channels may extend toward the shaft cavity, be in fluid communication with the shaft cavity, be distanced from the shaft cavity, or any combination thereof. One or more channels may be parallel to a shaft cavity, may follow the shaft cavity across a length of the hub, or both. A plurality of channels may be radially formed about the hub. A plurality of channels may be evenly spaced, unevenly spaced, or both about a hub. One or more channels may have any suitable shape for receiving and/or engaging a paddle, fins, or both. The one or more channels may engage with an end of one or more fins of a paddle. The channel may have a shape substantially reciprocal with a portion of a paddle, fin, or both; such as an attached end of the fin. The channel may be V-Shaped. T-Shaped, the like, or a combination thereof. For example, the hub may include a plurality of radially spaced channels which are T-shaped slots along a length of the hub.

The dispenser may include a paddle. The paddle may function to transfer litter from a hopper to a chamber, from a funnel opening to a dispensing opening, or both. The paddle may have any suitable size, shape, and/or configuration for transferring litter from the hopper to the chamber. The paddle may be configured to rotate during a refill cycle to transfer litter. The paddle may include one or more fins. The one or more fins may include a single fin or a plurality of fins. One or more fins may include 1 or more. 2 or more. 3 or more, 4 or more, or even 5 or more fins. One or more fins may include 10 or less. 8 or less, or even 7 or less fins. A plurality of fins may be separate from each, attached to one another, integral with one another, or any combination thereof to form a paddle. For example, the paddle may have a rotational shaft having a plurality of fins radially projecting therefrom. The rotational shaft may be rotationally engaged with a hub, drive shaft, or both. The rotational shaft may receive and mate with the hub, drive shaft, or both therein. As another example, the paddle may include a plurality of fins directly affixed to a hub. A plurality of fins may be useful in quickly transferring litter from a hopper to a chamber, controlling the amount of litter transferred, or both. The one or more fins may be rigid, semi-rigid, semi-flexible, flexible, or a combination thereof. The one or more fins may be flexible along a length of the one or more fins. Flexibility of the one or more fins may be advantageous in allowing a fin to scrape along a wall of a dispenser housing while rotating, maintaining contact with the dispenser housing to block litter from leaking from the hopper into the chamber, or both. Flexibility of the fins may also prevent jamming of the dispensing device while rotating. One or more fins of the paddle may be affixed to or integral with a hub, drive shaft, or both. Rotational movement of the drive shaft, hub, or both results in rotation of the paddle, fins, or both about the same rotational axis. One or more fins may be affixed to the hub at an attached end. The attached end may have a shape reciprocal with an engagement feature of the hub. The attached end may have a shape reciprocal with a channel of the hub. For example, the attached end may be in the shape of a “T”. The attached end of one or more fins may reside within and be engaged in one or more channels of the hub. Opposite the attached end of one or more fins is a free end. The free end may come into contact with an interior wall of the dispenser housing during rotation. One or more fins of a paddle may also be hingedly attached to a paddle. One or more fins of a paddle may be hinged, static, or both relative to the hub. Static may refer to the fin moving with the hub while still maintaining flexibility. A height of a fin may be the distance from the attached end to the free end. The height of the fin may allow the free end to be in contact with or free of contact with a wall of the dispenser housing. A fin may have a length. The length of a fin may be measured as substantially parallel to a rotational axis of the dispensing device, the shaft cavity, or both. The length of the fin may be greater than, about equal to, or less than a length of the hub.

The litter dispenser includes a dispenser housing. The dispenser housing may function to house a dispensing device, guide litter toward a chamber, guide litter toward a chute, or any combination thereof. The dispenser housing may have a shape which is generally cubical, cylindrical, spherical, conical, prismed, cuboidal, the like, or any combination thereof. For example, the dispenser housing may have a shape which is generally a trapezoidal prism, conical, or the like. The dispenser housing may be open on both ends. The dispenser housing may be open on an end which receives a bottom wall of a hopper. The dispenser housing may have an end with a shape substantially reciprocal to the cross-sectional shape of the hopper. The reciprocal shape may allow for the dispenser housing to receive a portion of the hopper, such as the bottom wall, a portion of the side walls, or both. The dispenser housing may have a larger cross-sectional area on one end as opposed to a smaller cross-sectional area on an opposite end. A shape of the hopper may be tapered. The dispensing device may include a single or a plurality of side walls. One or more side walls may include a shape reciprocal with one or more contours of an exterior of a bonnet, chamber, base, or any combination thereof. For example, a side wall adapted to be adjacent to a bonnet may be concave. The concave wall may match a convex and/or rounded shape of an exterior wall of a bonnet. The reciprocal shape may allow the side wall to rest directly adjacent to and in contact with the bonnet. The side walls may surround a hollow interior of the dispenser housing.

The dispenser housing may include a dispenser mount located therein. The dispenser mount may function to retain the dispensing device, allow movement (e.g., rotation) of one or more components of the dispensing device; funnel litter from a dispensing device through a dispensing opening; or a combination thereof. The dispenser mount may have any size, shape, and/or configuration suitable for retaining a dispensing device within the dispenser housing. The dispenser mount may include one or more cradles. One or more cradles may function to retain (e.g., cradle) one or more components of the dispensing device. One or more cradles may allow for rotation, may prevent rotation, or both of one or more components of the dispensing device. One or more cradles may hold a drive source, drive shaft, insert, hub, or any combination thereof. One or more cradles may have a shape reciprocal with at least a portion of a contour of the one or more components of a dispensing device. One or more cradles may have a shape which is generally U-shaped. For example, the cradle may be U-shaped to be reciprocal with a cylinder shape of a drive source. The U-shaped cradle may hold the drive source relatively static while the drive source applies torque to the drive shaft. The dispenser mount may include two or more mounting walls. The two or more mounting walls may function to retain one or more components of a dispensing device therebetween while allowing movement. The two or more mounting walls may be located adjacent to one or more cradles. The two or more mounting walls may extend from one side wall of the dispenser housing to an opposing side wall. The two or more mounting walls may be spaced apart. The two or more mounting walls may be spaced apart by a distance about equal to a length of a hub, paddle, one or more fins, or any combination thereof. One of the mounting walls may include an opening. The opening may function to receive a drive shaft, hub, or both therethrough. The mounting wall with the opening may be adjacent to one or more cradles. Located between the two or more mounting walls may be a portion of a dispensing device. Extending across from one mounting wall to an opposing mounting wall may be a drive shaft, hub, paddle, one or more fins, or any combination thereof. Adjacent to the two or more mounting walls, side walls, or both may be a dispensing outlet. A dispensing outlet may be formed by the two or more mounting walls, a portion of two or more side walls, or both. A dispensing outlet may be substantially hollow. A hollow interior of a dispensing outlet may form a dispensing opening. A dispensing outlet may project beyond a hollow interior of a dispenser housing. The two or more mounting walls, two or more side walls, or both may taper such that the dispensing outlet is funnel shaped. The dispensing outlet may be in fluid communication with a chute.

The litter dispenser may include a chute. A chute may function to funnel litter from a dispensing device, dispenser housing, dispenser opening, or a combination thereof into a chamber. A chute may have any size, shape, and/or configuration to place the dispenser housing in fluid communication with an interior of a chamber. The chute may be at least partially aligned with a rotational axis of a chamber. A chute may include a chute housing, chute inlet, chute outlet, chute opening, chute slide, the like, or any combination thereof. A chute housing may connect the litter dispenser to an interior of the chamber. The chute housing may be substantially aligned, centered, off centered, or a combination thereof with a rotational axis of the housing. Being aligned, such that the longitudinal axis of the chute housing is substantially centered with the rotational axis of the chamber allows for the dispenser to dispense litter into the chamber at any point during a cleaning cycle, avoid interference with one or more interior components of a chamber, allow the chute housing to remain static as the chamber rotates, or any combination thereof. A chute, chute housing, or both may be approximately parallel (e.g., same angle) as the rotational axis of the chamber. A chute housing may be in fluid communication with a dispenser housing, an interior of a chamber, or both. A chute housing may receive, engage, or both a dispensing outlet. The chute housing may have any suitable shape for being affixed to both a dispenser housing and a chamber. The chute housing may have a shape which is generally cubical, cylindrical, spherical, conical, prismed, cuboidal, the like, or any combination thereof. For example, the chute housing may be substantially cylindrical. The chute housing may be hollow or partially hollow. A hollow interior may allow for litter to pass therethrough. The chute housing may include a chute inlet. A chute inlet may function to be in fluid communication with a dispensing outlet of a dispenser housing. A chute inlet may project from the chute housing. For example, the chute inlet may project from the cylindrical wall of the chute housing. A chute inlet may have a shape reciprocal with an interior or exterior shape of a dispensing outlet. The chute inlet may receive the dispensing outlet therein. The chute inlet may be adjacent to, integral with, affixed to, or a combination thereof a chute wall. A chute wall may be located within a chute housing. A chute wall may function to funnel litter from a dispensing outlet, chute inlet, or both toward a chute outlet, interior of a chamber, or both. A chute wall may extend from a chute inlet to a chute outlet. A chute wall may be angled relative to a longitudinal axis of the chute housing. The longitudinal axis of the chute housing may extend along a length, hollow interior, or both of the chute housing. A chute wall may be angled from the chute inlet to a bottom edge of the chute housing, the chute outlet, or both. A chute wall may be angled by about 100 degrees or greater, about 110 degrees or greater, about 120 degrees or greater, or even about 130 degrees or greater relative to the longitudinal axis of the chute housing. A chute wall may be angled by about 160 degrees or less, about 150 degrees or less, or even about 140 degrees or less relative to the longitudinal axis of the chute housing. The angle may be the angle facing toward a chute outlet. The chute outlet may be an open end of the chute housing. The chute outlet may be located within a chamber. The chute outlet may be located adjacent to, distanced from, in proximity to, or a combination thereof a limiting wall of a chamber. The chute outlet, chute slide, or both may cooperate with a limiting wall to form an aperture for allowing litter to transfer from the chute to an interior of the chamber. The chute outlet, chute slide, or both may cooperate with a limiting wall of the chamber to guide litter toward a bottom of an interior of the chamber (e.g., lower chamber, liner).

The litter dispenser may be comprised of one or more materials. The one or more materials may be any material suitable for being shaped (e.g., molded) into the separate components of the litter dispenser, having litter located therein, or both. One or more materials of the hopper, dispenser housing, chute, or a combination thereof may be comprised of a polymeric system. The polymeric system may be a thermoplastic or a thermoset material. The polymeric system may be one suitable for molding into the shape or shapes of each portion of the housing. Polymeric systems may include polyolefins, styrenics, acrylates, acrylonitriles, polycarbonates, polyurethanes, acrylonitrile butadiene styrene (ABS), and blends thereof. Such materials may be modified with a number of additives such as fillers, elastomers, fire retardants, stabilizers, and the like. The portions of the litter dispenser may be prepared by any process capable of forming the materials into the desired shapes of the housing and able to perform the necessary functions. Portions of the litter dispenser may be formed by injection molding, reaction injection molding, thermoforming, the like, or any combination thereof. Some portion of the housing may be opaque, transparent, or a combination of both. For example, a hopper may be transparent to visibly see the litter within the hopper. For example, a dispenser housing may be transparent to visibly see movement of the dispensing device. One or more other materials of the litter dispenser may be comprised of one or more flexible materials. One or more paddles and/or fins may be comprised of one or more flexible materials or may be comprised of materials suitable for the housing. One or more paddles and/or fins may be comprised of any suitable material capable of deflection, having elastomeric properties, or both. One or more paddles and/or fins may be comprised of one or more elastomers having viscoelasticity, one or more rubbers, or both. Exemplary flexible materials may include polyisoprene, polybutadiene, polyisobutylene, polyurethane, natural rubber, synthetic rubber, or a combination thereof.

Illustrative Embodiments

Any of the features described herein may be combined or used in lieu of one or more features described in U.S. Pat. Nos. 8,757,094 and 9,433,185, and US Patent Application Publication Nos. 2013/0333625 and 2019/0364840, which are incorporated by reference herein in their entirety for all purposes.

FIG. 1 illustrates an automatic litter device 1. The device 1 includes a chamber 10 and a base 12. Located within the chamber 10 is litter 5. The chamber 10 is supported by the base 12. The chamber 10 is rotatable relative to the base 12. The base 12 may comprise one or more components which assist in rotation of the chamber 10. The chamber 10 is at least partially covered by a bonnet 14. The bonnet 14 is attached to the base 12. The chamber 10 is also rotatable relative to the bonnet 14 (e.g., the bonnet 14 may remain static while the chamber 10 rotates). The base 12 includes a waste drawer 16. Upon rotation of the chamber 10, waste within the chamber 10 may be transferred from within the chamber 10 to the waste drawer 16. The waste drawer 16 includes a step 18. The step 18 may include a cleaning device 20. The device 1 includes an opening 22. The opening 22 may allow for an animal to enter and exit the chamber 10. The animal may use the step 18 to facilitate entering and exiting the chamber 10. The device 1 also includes a bezel 24. The bezel 24 is located about the opening 22.

The device 1 may include a litter dispenser 200 (such as illustrated in FIG. 23). The litter dispenser 200 (not shown) may contain additional litter 5 separate from that located in the chamber 10. The litter dispenser 200 (not shown) may be in fluid communication with the chamber 10 such that litter 5 is able to transfer from the litter dispenser 200 to the chamber 10. The litter dispenser 200 (not shown) may be attached to the chamber 10, the base 12, or both. The litter dispenser 200 may release litter 5 into the chamber 10 upon one or more sensors 52 (not shown) detecting a certain level or less of litter 5 within the chamber 10. The litter dispenser 200 (not shown) may stop releasing or not release litter 5 into the chamber 10 upon one or more sensors 52 detecting a certain level of litter 5 or greater within the chamber 10.

FIG. 2 illustrates an automatic litter device 1. The device 1 includes a chamber 10. A bonnet 14 is located around a portion of the chamber 10. An opening 22 is formed in the chamber 10. Inside the chamber 10 is a septum 32. A bezel 24 is located about the opening 22. An outer bezel 46 is the portion of the bezel 24 visible from the exterior. The bezel 24 is affixed to the base 12. The base includes a base frame 68. Located within and removable from the base frame 68 is a waste drawer 16. The waste drawer 16 includes a step 18.

FIG. 3 illustrates an automatic litter device 1. The litter device 1 includes a bonnet 14. A bonnet 14 covers an upper chamber 26. The upper chamber 26 is part of a chamber 10. The chamber includes an opening 22. The device 1 includes a step 18. The step 18 may allow for an animal to comfortably enter and exit from the chamber 10 via the opening 22. The step 18 includes a cleaning device 20.

Figure 4:
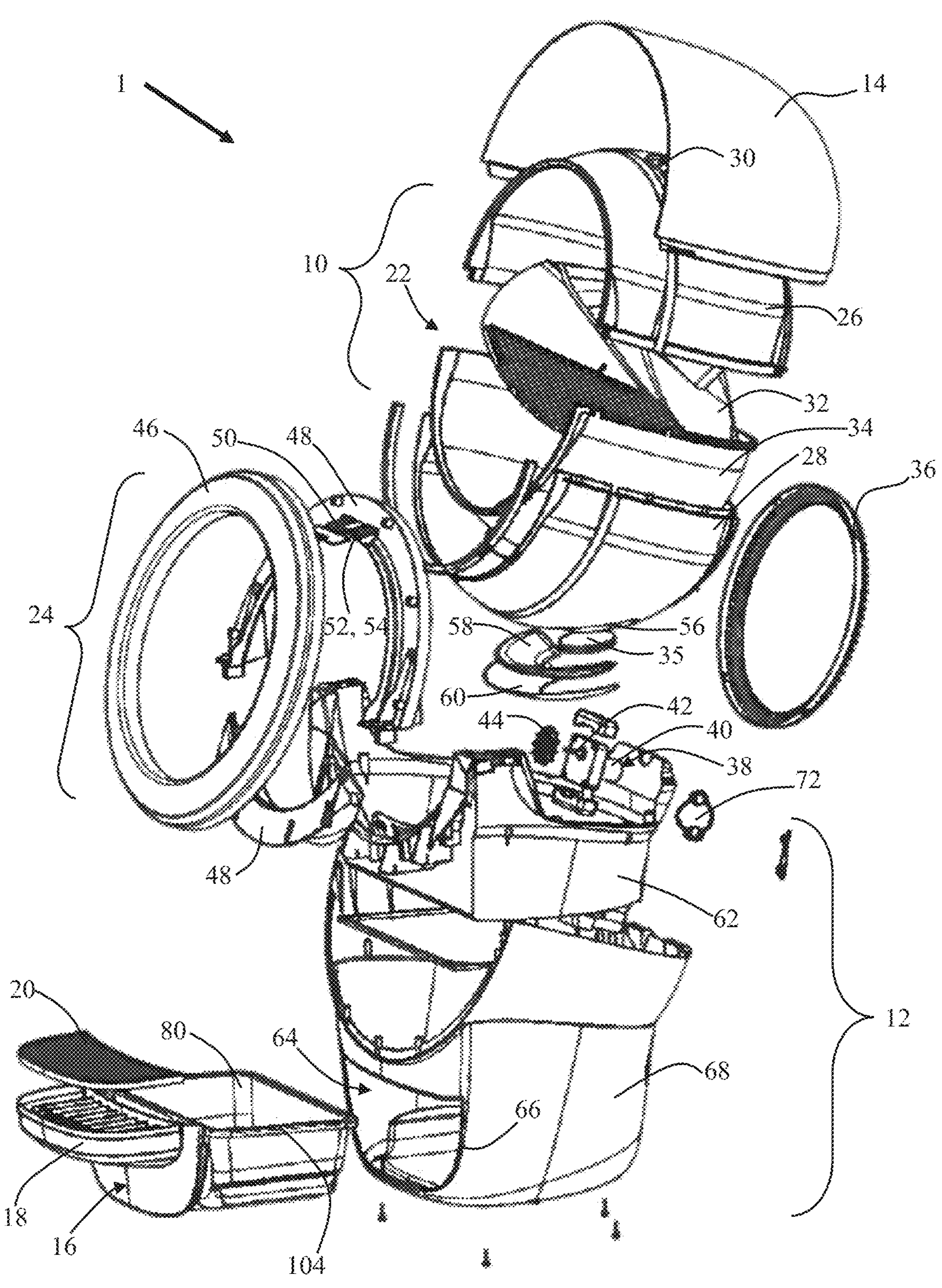
FIG. 4 is a top view of an automatic litter device according to the teachings herein.

FIG. 4 is an exploded view of the automatic litter device 1. A bonnet 14 may cover the chamber 10. The bonnet 14 may be pivotally engaged with the base 12, such as by one or more hinges 70 (not shown). The chamber 10 comprises an upper chamber 26 and a lower chamber 28. The bonnet 14 has a shape substantially reciprocal to that of the upper chamber 26. The bonnet 14 is also solid such that it covers a waste opening 30 formed in the upper chamber 26. Located inside the chamber 10 is a septum 32. Also located inside the chamber 10 is a liner 34. The liner 34 may be flexible. The liner 34 may include a weight 35. The weight 35 may reside within an indentation (not shown) of the liner 34. The lower chamber 28 includes a filter cavity 56. The filter cavity 56 houses a removable filter 58. The filter 58 is retained within the filter cavity 56 by a filter cap 60. Affixed to the exterior of the chamber 10 is a track 36. The track 36 is located opposite the opening 22 of the chamber 10. The track 36 is in the form of a ring gear having the gear teeth formed about a periphery. The track 36 is rotationally engaged with a drive source 38. The drive source 38 is a motor 40 with a drive shaft 42 rotationally engaged with a gear 44. The gear 44 meshes with the track 36 so that rotation from the drive source 38 is transferred to the track 36. The track 36 is statically affixed to the chamber 10. Thus, rotation of the track 36 results in rotation of the chamber 10. Located about the opening 22 is a bezel 24. The bezel 24 is affixed to the base 12. The bezel 24 includes an outer bezel 46 and inner bezel 48. The outer bezel 46 is affixed to and covers the inner bezel 48. The bezel 24 includes a sensor board 50. The sensor board 50 is mounted onto the inner bezel 48 and located between the outer bezel 46 and inner bezel 48. The sensor board 50 is mounted such that it is opposite the base 12, including the waste drawer 16. The sensor board 50 includes one or more sensors 52. The one or more sensors 52 may include one or more laser sensors 54. The base 12 includes a chamber support 62 and base frame 68. The chamber support 62 rests within the base frame 68. The chamber support 62 houses the drive source 38. The chamber support 62 separates the waste drawer 16 from the chamber 10. The chamber support 62 aids in forming a drawer cavity 64. The waste drawer 16 resides within the drawer cavity 64. The waste drawer 16 is movable in and out of the drawer cavity 64 via a drawer opening 66 in the base 12. The waste drawer 16 includes a step 18. The step 18 may be able to be used as a handle. The step 18 includes a cleaning device 20. The waste drawer 16 includes a waste bin 80. The waste drawer 16 also includes a seal 104. The seal 104 may be located about a periphery of a waste bin 80. The periphery may be defined by a rim or flange. The base 12 may include one or more port caps 72.

Figures 5, 6, 7, 8:
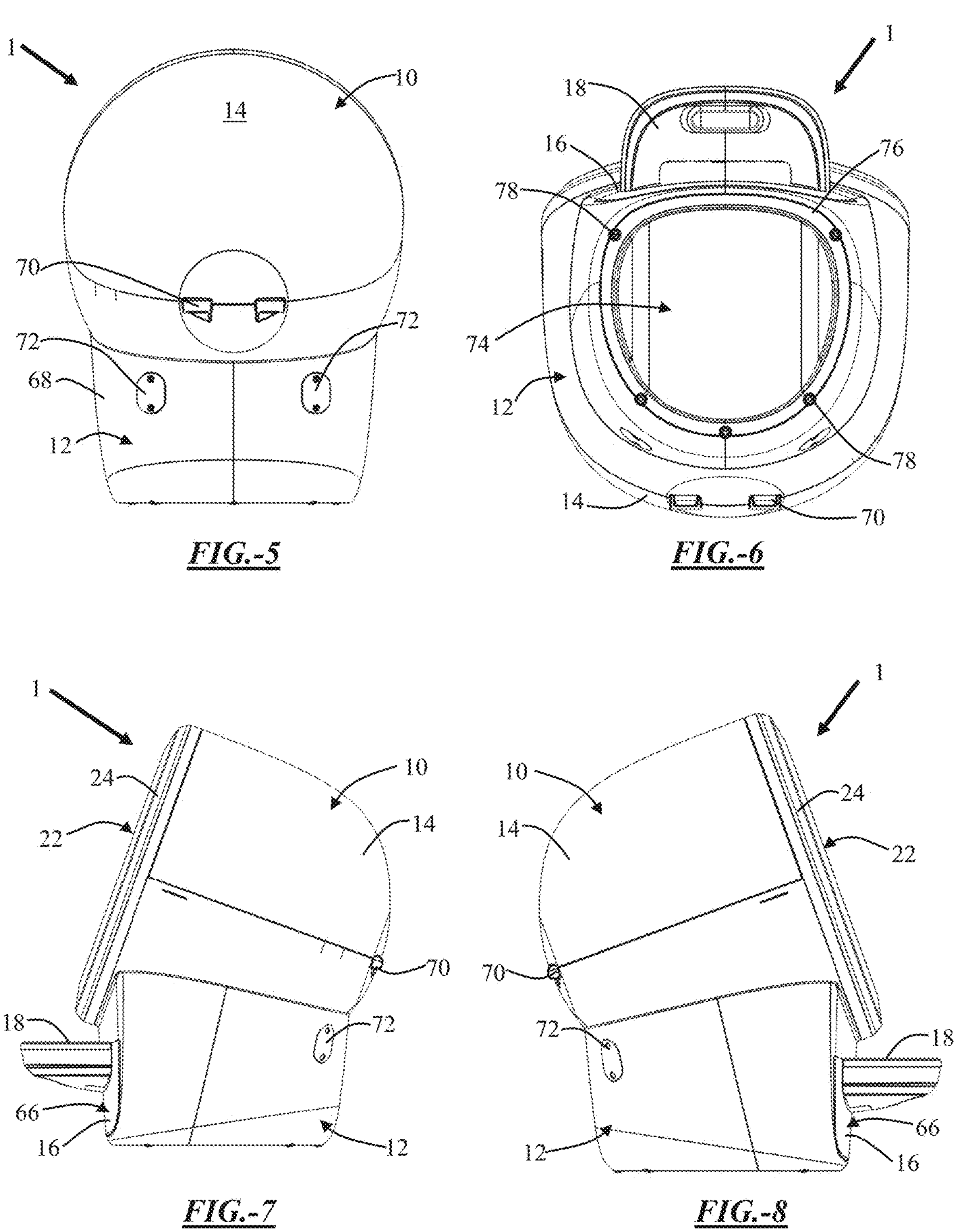
FIG. 5 is a rear view of an automatic litter device according to the teachings herein.
FIG. 6 is a bottom view of an automatic litter device according to the teachings herein.
FIG. 7 is a right side view of an automatic litter device according to the teachings herein.
FIG. 8 is a left side view of an automatic litter device according to the teachings herein.

FIG. 5 illustrates an automatic litter device 1. The device 1 includes a chamber 10 supported by a base 12. Covering the chamber 10 is a bonnet 14. The bonnet 14 is pivotally affixed to the base 12. The bonnet 14 is affixed to the base frame 68 via one or more hinges 70. The base frame 68 includes one or more port caps 72. The port caps 72 are located opposite a drawer opening 66 (not shown).

FIG. 6 illustrates an automatic litter device 1. The device includes a base 12. Located within the base 12 is waste drawer 16. The waste drawer 16 includes a step 18. The base 12 is affixed to a bonnet 14 via one or more hinges 70. The bottom 74 of the base 12 includes a bottom ridge 76. The bottom ridge 76 may be useful for being the portion of the device 1 which rests on a surface, such as the floor. The bottom ridge 76 includes a plurality of feet 78. The feet 78 may include threaded shafts (not shown). The feet 78 may move relative to the bottom ridge 76. Movement of the feet 78 out of the ridge 76 may allow for balancing the device 1 on uneven surfaces, such a slope on a floor.

FIGS. 7 and 8 illustrate opposing sides of an automatic litter device 1. The device 1 includes a chamber 10 supported by a base 12. A bonnet 14 covers a portion of the chamber 10, while another portion of the chamber 10 rests within the base 12. The bonnet 14 is affixed to the base 12. The bonnet 14 is pivotally engaged with the base 12 via one or more hinges 70. The one or more hinges 70 are located opposite an opening 22. Located about an opening 22 to the chamber 10 is a bezel 24. The bezel 24 is affixed to the base 12. The base includes a plurality of port caps 72. Opposite the port caps 72 is a drawer opening 66. Located within the drawer opening 66 is a waste drawer 16. The waste drawer 16 includes a step 18.

Figures 9, 10:
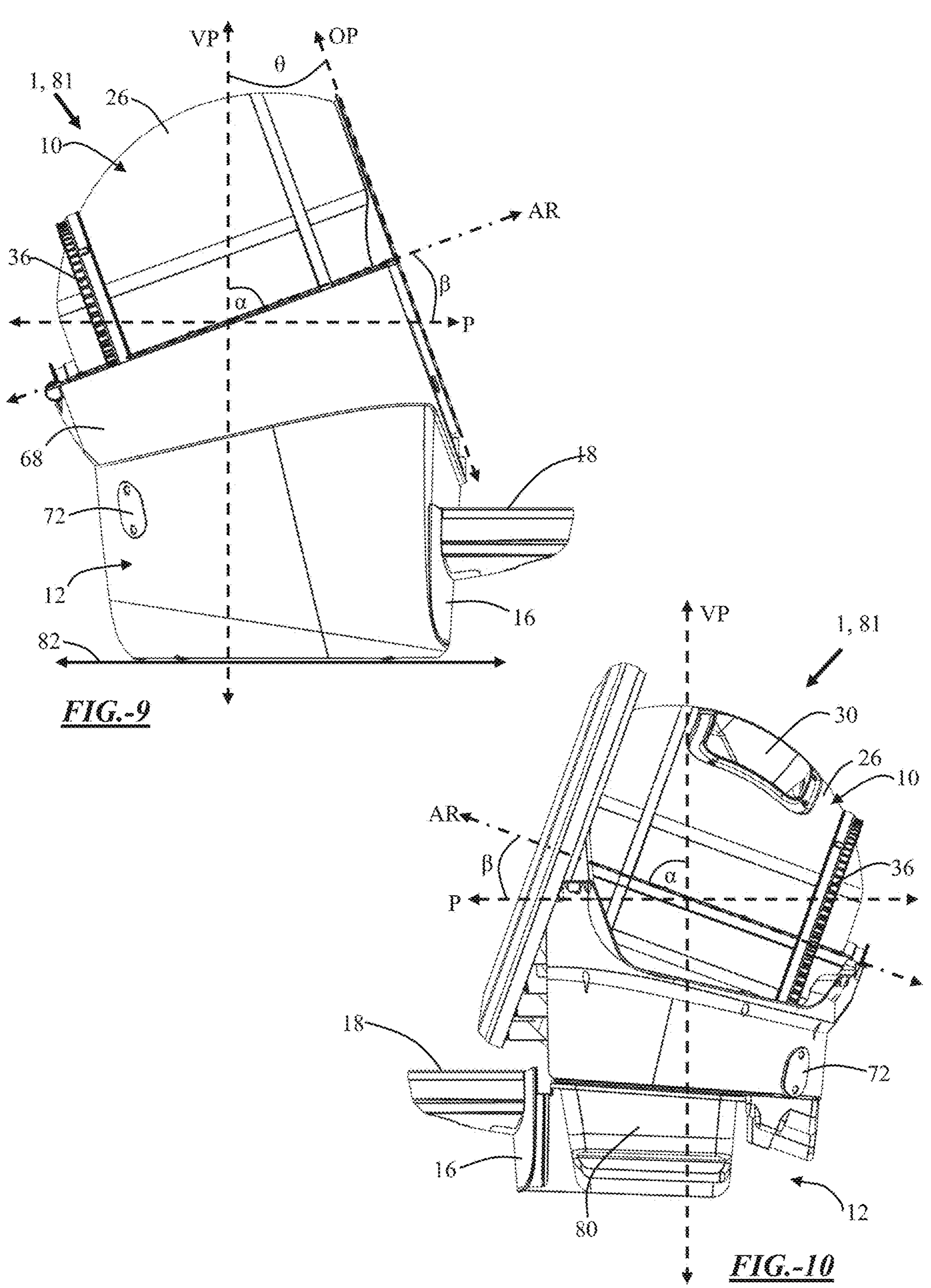
FIG. 9 is a left side view of an automatic litter device with a bonnet removed according to the teachings herein.
FIG. 10 is a right side view of an automatic litter device with a bonnet and base frame removed according the teachings herein.

FIG. 9 illustrates an automatic litter device 1 without a bonnet 14, while FIG. 10 also has the base frame 68 removed. The device 1 includes a chamber 10. While in a home position 81, an upper chamber 26 is located above the base 12. The base 12 includes one or more port caps 72. The base 12 also includes a waste drawer 16 with a step 18. The waste drawer 16 includes a waste bin 80. The waste bin 80 is located under the chamber 10. When the chamber 10 rotates during a cleaning cycle, the waste port 30 is aligned with the waste bin 80 allowing waste to be transferred from chamber 10 to the waste drawer 16. A cleaning cycle results in rotation of the chamber 10. Rotation of the chamber 10 results from rotation of the track 36. The track 36 is statically affixed to the chamber 10 so that rotation of the track 36 results in rotation of the chamber 10. The chamber 10 rotates about an axis of rotation AR. The axis of rotation AR forms an angle $\alpha$ with vertical which is represented by a vertical plane VP. The axis of rotation AR forms an angle $\beta$ with a plane P parallel to a surface 82. The surface 82 is one which the device 1 rests upon, such as a floor. The opening 22 extends along an opening plane OP. The opening plane OP forms an angle Θ with the vertical plane VP.

FIGS. 11 and 12 illustrate a septum 32. The septum 32 includes a living hinge 84. The living hinge 84 connects a septum portion 86 to a screen 88. The living hinge 84 allows the screen 88 to be pivotable relative to the septum portion 86. The septum 32 includes a septum opening 100. The septum opening 100 is configured to be aligned with the waste opening 30 (not shown). The septum opening 100 is formed in a neck 102 which extends through and engages with the waste opening 30 (not shown).

FIG. 13 illustrates an upper chamber 26. The upper chamber 26 is shaped like a half-sphere. The upper chamber 26 includes a waste opening 30. The waste opening 30 could alternatively be located along any other portion or the chamber 10, as long as the waste opening 30 aligns with the waste bin 80 (not shown) for waste disposal during a cleaning cycle. The waste opening 30 is substantially square-shaped. The upper chamber 26 includes a rim 92. The upper chamber 26 includes an opening rim 94. The opening rim 94 forms a substantially U-shaped cut-out in the upper chamber 26. The opening rim 94 forms a portion of the opening 22.

FIG. 14 illustrates a lower chamber 28. The lower chamber 28 is shaped like a half-sphere. The lower chamber 28 includes a rim 92. The rim 92 of the lower chamber 28 is able to mate with the rim 92 of the upper chamber 26 The lower chamber 28 also includes an opening rim 94. The opening rim 94 forms a U-shaped cut-out in the lower chamber 28. The opening rim 94 forms a portion of the opening 22.

Figures 15, 16:
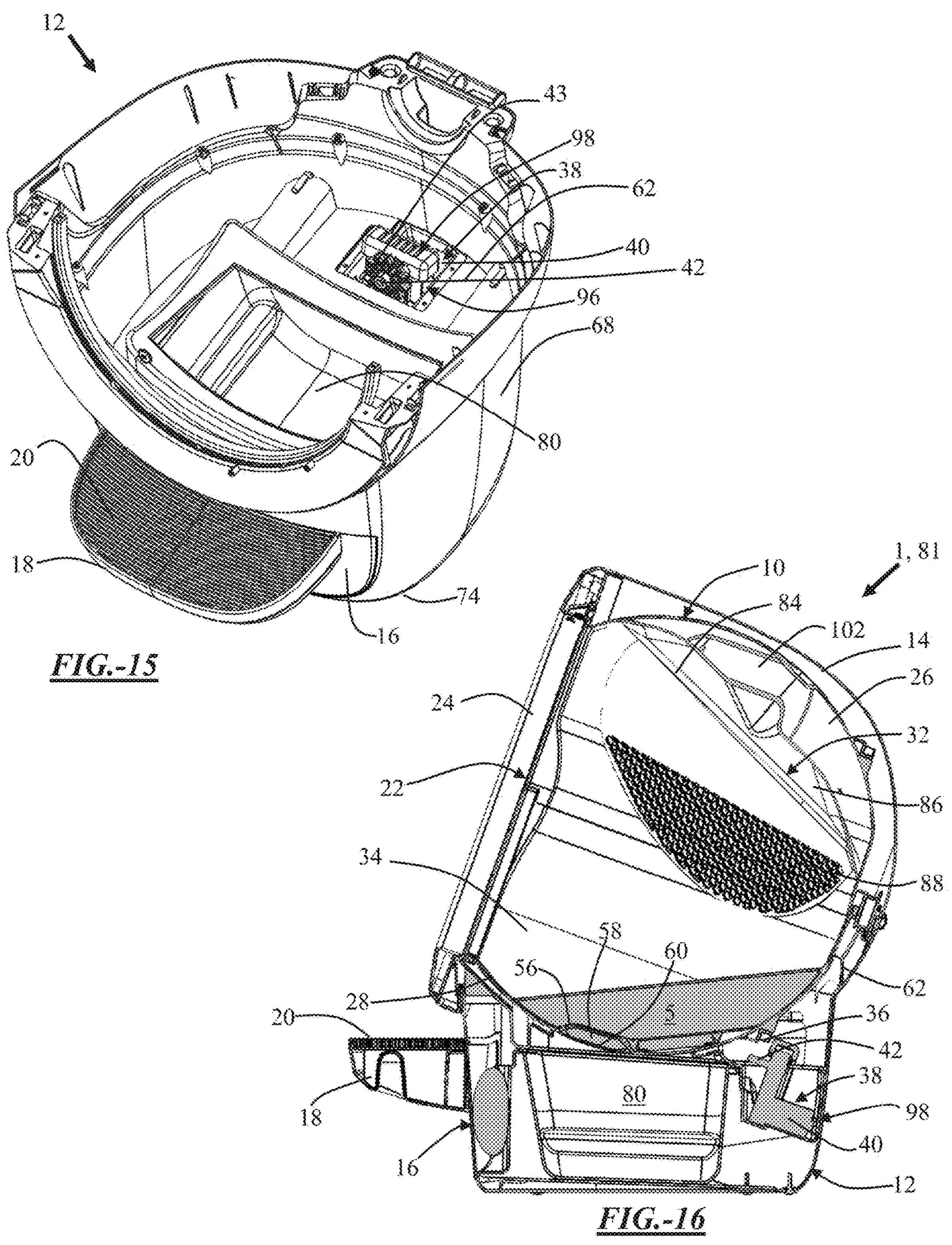
FIG. 15 is a perspective view of a base according to the teachings herein.
FIG. 16 illustrates a cross-section along section A-A of FIG. 3 of an automatic litter device according to the teachings herein.

FIG. 15 illustrates a base 12. The base 12 includes a base frame 68. Located within the base frame 68 is a waste drawer 16. The waste drawer 16 includes a waste bin 80 located within the base frame 68. The waste bin 80 is located between a bottom 74 and a chamber support 62. The waste drawer 16 also includes a step 18. Located on the step 18 is a cleaning device 20. The chamber support 62 includes an opening 96. The opening 96 is open to the waste bin 80. The chamber support 62 also houses some of the electrical controls 98 of the device 1. The electrical controls 98 include the drive source 38. The drive source 38 includes a motor 40 and drive shaft 42. The drive shaft 42 is engaged with a gear 44, such as a pinion. The gear 44 meshes with and drives the track 36 (not shown).

FIG. 16 illustrates an interior of an automatic litter device 1. The device 1 includes a chamber 10 and a base 12. The chamber 10 includes an upper chamber 26 attached to a lower chamber 28. The chamber 10 is substantially spherical or globe-shaped. The chamber 10 includes an opening 22. The opening 22 leads into the interior of the chamber. An animal can enter through the opening 22 to use litter 5 located within the chamber 10. Also, within the chamber is a liner 34. Opposite of the liner 34 is a septum 32. The septum 32 includes a septum portion 86 attached to a screen 88 via a living hinge 84. The septum 32 includes a neck 102 which forms a septum opening 100 (not shown). The septum opening 100 is aligned with the waste opening 30 (not shown) in the upper chamber 26. In the home position 81, the bonnet 14 covers the waste opening 30. During a cleaning cycle, the chamber 10 rotates such that the waste opening 30 aligns with the opening 96 (not shown) in the chamber support 62. The waste opening 30 also aligns with the waste bin 80, so that waste may pass from the waste opening 30 to the waste bin 80. The waste bin 80 is part of a waste drawer 16. The waste drawer 16 includes a step 18. The step includes a cleaning device 20 located therein. The waste drawer 16 is located within a base 12. The base 12 includes the chamber support 62. The chamber support 62 houses one or more electrical controls 98. The one or more electrical controls 98 include the drive source 38. The drive source 38 includes a motor 40 and drive shaft 42. The drive source 38 is in rotatable communication with the track 36 to result in rotation of the chamber 10 during a cleaning cycle.

Figure 17:
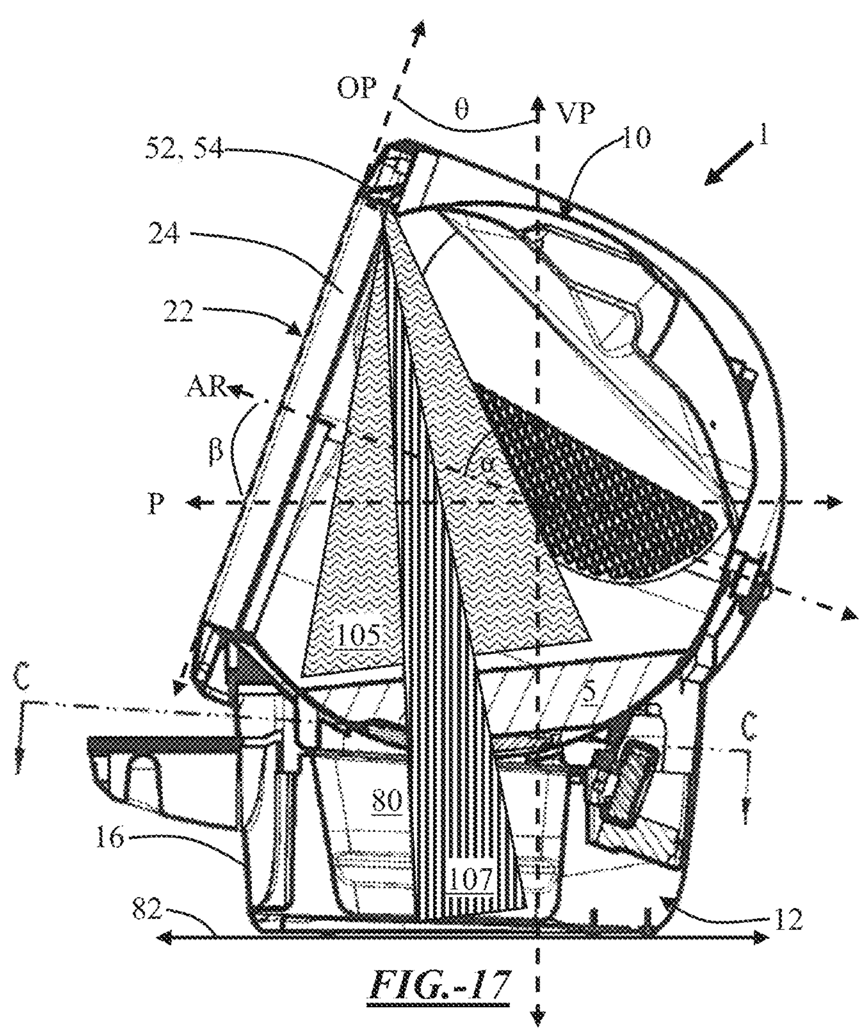
FIG. 17 illustrates a cross-section along section A-A of FIG. 3 of an automatic litter device according to the teachings herein.

FIG. 17 illustrates a sensing range within an automatic litter device 1. The device 1 includes a chamber 10 supported by a base 12. The chamber 10 is tilted such that an axis of rotation AR is not parallel to a surface 82. The axis of rotation AR forms an angle α with vertical which is represented by a vertical plane VP. The axis of rotation AR forms an angle β with a plane P parallel to a surface 82. The opening 22 extends along an opening plane OP. The opening plane OP forms an angle Θ with the vertical plane VP. Due to the tilt of the chamber 10, one or more sensors 52 affixed to the bezel 24 at the opening 22 are able to sense one or more conditions within the device 1. Specifically, due to the tilt of the chamber 10, the one or more sensors 52 are aligned with the litter 5 and waste bin 80. The one or more sensors 52 may be one or more laser sensors 54. The one or more laser sensors 54 may include one or more cone lasers. For example, two wide cone lasers and a one narrow cone laser may be used together. The one or more sensors 52 may be able to measure a distance, level, amount, displacement, and/or even position of litter, waste, or both within the chamber 10, within the waste drawer 16, or both. For example, a level or amount of litter within the chamber may be determined by the distance measured from the one or more sensors 52 to an upper surface of the litter 5 within the chamber. One or more of the sensors 52 have an animal presence sensing range 105. The animal presence sensing range 105 covers a majority of an upper surface of the litter 5 within the chamber. One or more of the sensors 52 which provide the animal presence sensing range 105 are able to sense or detect the presence of an animal within the chamber 10. The one or more sensors 52 which provide the animal presence sensing range 105 may be one or more cone laser sensors, such as two wide cone laser sensors or even the combination of two wide cone laser sensors and one narrow cone laser sensor. The one or more sensors 52 have a waste level sensing range 107. The waste level sensing range 107 is able to cover a surface area within a waste bin 80 of a waste drawer 16. The one or more sensors 52 which provide the waste level sensing range 107 have the "line of sight" aligned with the waste bin 80 when the waste opening 30 is rotated during a cleaning cycle such that the waste opening 30 exposes the waste bin 80. This line of sight alignment is a result of the tilt of the chamber relative to the vertical axis. If the chamber were to have its axis aligned with the vertical axis, the sensors would have a sensing range looking across the opening as opposed to into the chamber. The one or more sensors 52 which provide the waste level sensing range 107 may include a single narrow cone laser sensor. In addition to sensing the presence of an animal within the chamber 10, waste or a waste level within the waste drawer 16, the one or more sensors 52 may also provide position sensing of the chamber 10 before, during, and/or after a cleaning cycle.

Figure 18:
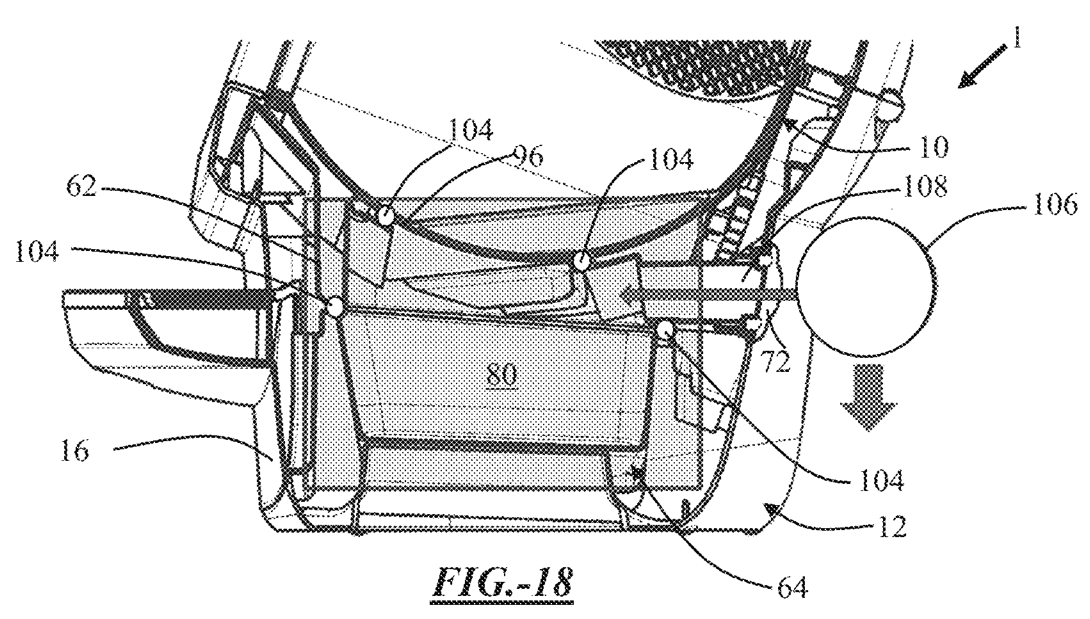
FIG. 18 illustrates a cross-section along section A-A of FIG. 3 of a portion of an automatic litter device according to the teachings herein.

FIG. 18 illustrates a seal arrangement of the automatic litter device 1. The seal arrangement may be particularly beneficial in preventing odor from transferring from the base 12 around the chamber support 62 and around chamber 10, and thus out of the automatic litter device 1. The seal arrangement may include a plurality of seals 104. The seals

104 may include any suitable mechanical seal for preventing leakage of liquid, odors, waste, and even loose litter. The plurality of seals 104 may include one or more gaskets, such as one or more flange gaskets, or one or more brush type seals. The seals 104 may be located between mating surfaces of the waste drawer 16 and the chamber support 62. For example, a seal 104 may be located about at least a portion of a perimeter of the waste bin 80 where the waste bin 80 contacts the chamber support 62. As another example, a seal 104 may be located about at least a portion of a periphery of an opening 96 of a chamber support 62. The seal 104 may seal a gap between the chamber 10 and the chamber support 62. The waste bin 80 may have a ventilation system 106. The ventilation system 106 may be connected to the device 1 via one or more ports 108. The one or more ports 108 may be covered by one or more port caps 72 if not connected to a ventilation system 106. The ventilation system 106 may function by removing air (e.g., odor) from the waste bin 80. The ventilation system 106 may include one or more filters, fans, and/or ducts to move air from the device 1. For example, the ventilation system 106 may even include one or more ducts which are adapted to connect to window openings, door openings, or even vent openings of a home, such that odor from the device 1 is vented outside of the home.

Figure 19A:
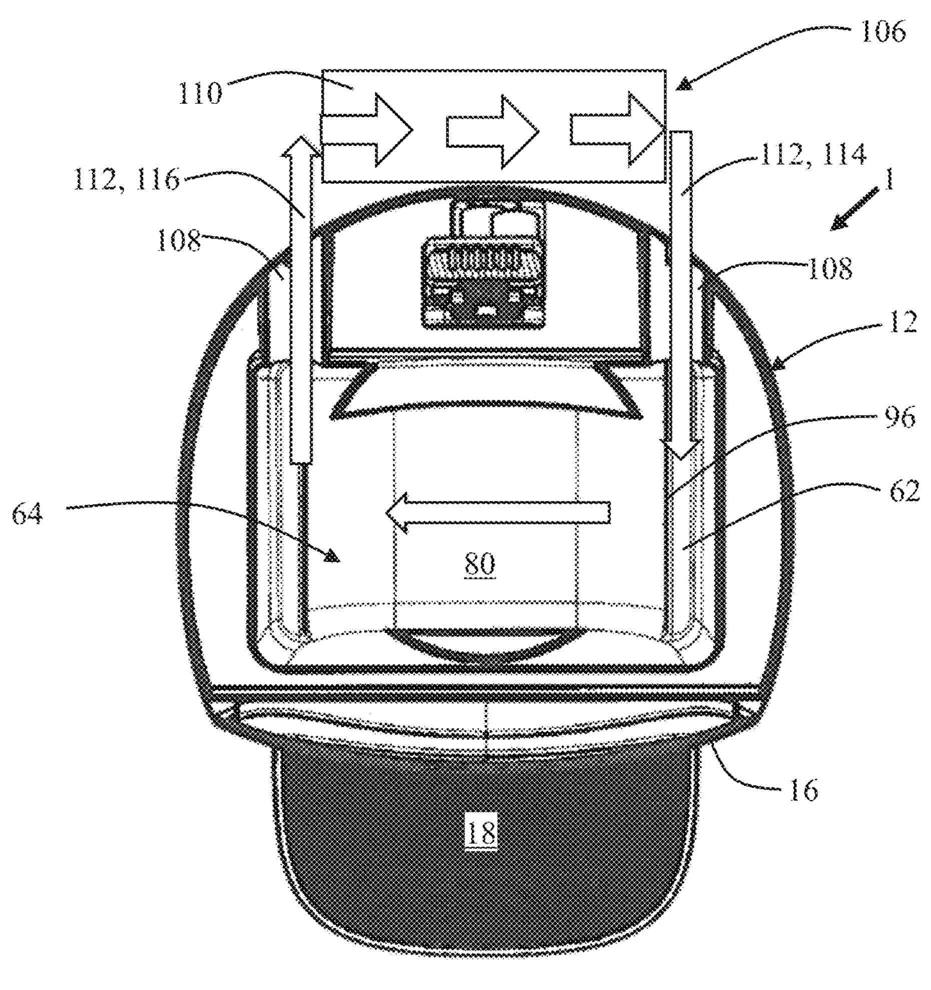
FIG. 19A illustrates a cross-section along section C-C of FIG. 17 of an automatic litter device according to the teachings herein.
Figure 19B:
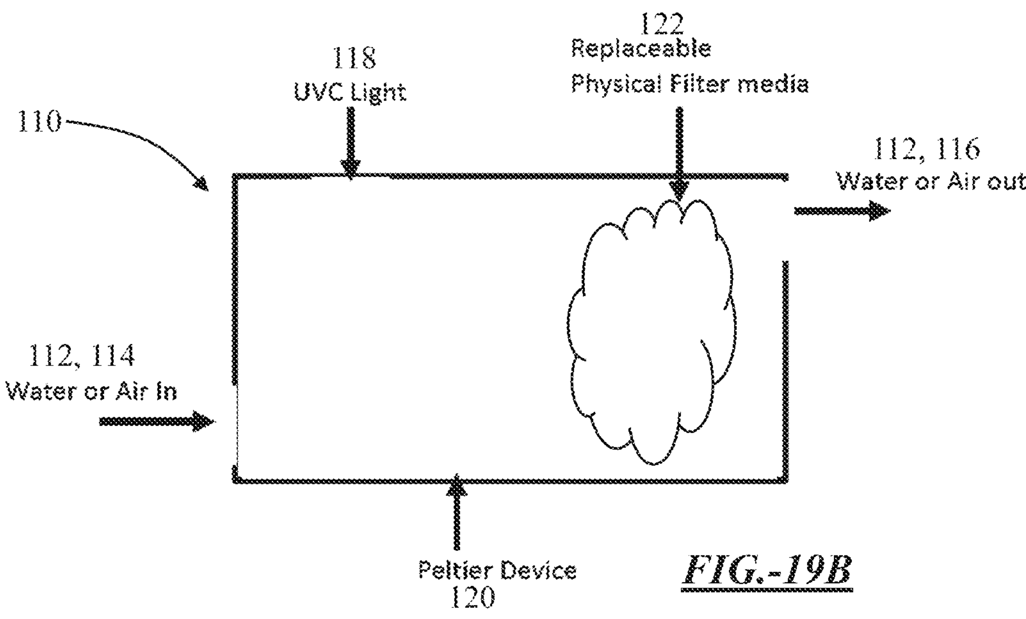
FIG. 19B illustrates a filter system of an automatic litter device as shown in FIG. 19A according to the teachings herein.

FIGS. 19A and 19B illustrate a ventilation system 106 useful with the device 1. The ventilation system 106 includes a plurality of ducts 112. The ducts 112 are connected to the ports 108. Via the ports 108, the ducts 112 are in fluid communication with the waste bin 80. The ducts 112 provide for an inflow 114 and outflow 116. The outflow 116 pulls air from the waste bin 80 while the inflow 114 pushes air from a filtering system 110 into the waste bin 80. The filtering system 110 may be an active system (e.g., moves air). The filtering system 110 may move air via one or more fans (not shown) to provide for air circulation. The filtering system 110 may include one or more fans, filters, lights, heat exchange devices, and/or the like which are capable of reducing, neutralizing, or even eliminating odor, such as odor related to animal waste (e.g., urine, feces). The reduction of odor may occur through eliminating bacteria causing the odor, filtering the odor, and/or even cooling the air to reduce the odor.

One exemplary filtering system may be that as shown in FIG. 19B. The filtering system 110 may include a connection to an outflow 116, such that outgoing air from the waste bin 80 is routed into the filtering system. The filtering system 110 may include a connection to an inflow 114, such that incoming air from to the waste bin 80 is air that has been treated by the filtering system 110. The filtering system 110 may include one or more light treatment devices 118. The one or more light treatment devices 118 may be any energy source suitable for killing bacteria waste which causes a malodor. For example, the one or more light treatment devices 118 may include one or more ultraviolet lights. The filtering system 110 may include one or more thermoelectric devices 120. The one or more thermoelectric devices 120 may be any device suitable for cooling the air passing through the filtering system 110. By cooling the air, growth of bacteria in waste which causes malodors may be suppressed, thus helping prevent odor. The one or more thermoelectric devices 120 may include one or more Peltier devices. The filtering system 110 may include one or more physical filters 122. The one or more physical filters 122 may be any filter suitable for absorbing odor from air as the air passes through the filter. One or more physical filters 122 may include zeolite, charcoal, nylon wool, synthetic wool, silica gel, baking powder, the like, or a combination thereof. The filtering system 110 may have one, two, or all three of: the light treatment device 118, thermoelectric device 120, and physical filter 122.

Figures 20, 21, 22:
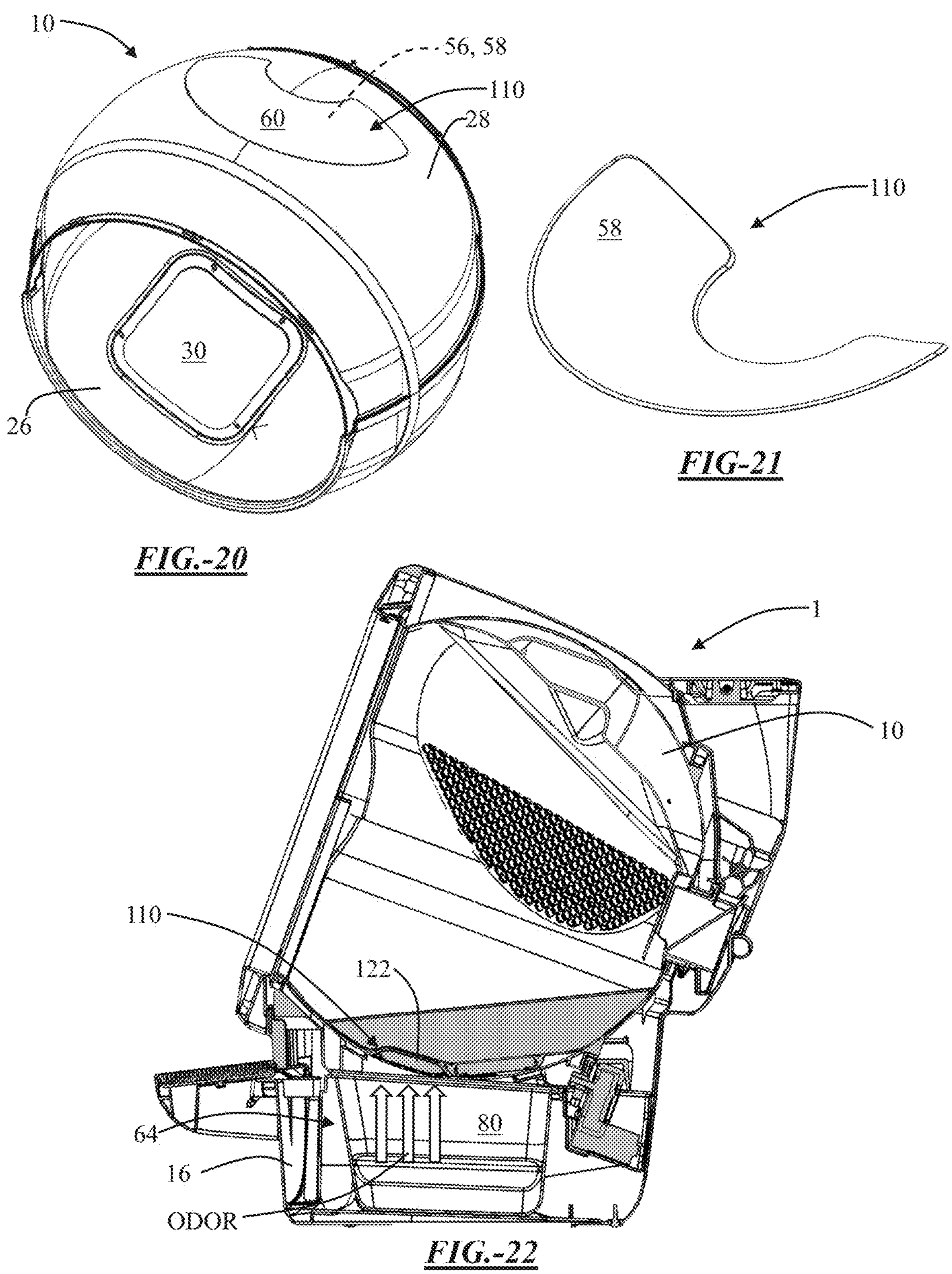
FIG. 20 illustrates a perspective of a chamber according to the teachings herein.
FIG. 21 illustrates a filter according to the teachings herein.
FIG. 22 illustrates a cross-section along section A-A of FIG. 3 of an automatic litter device according to the teachings herein.

FIG. 20 illustrates a perspective view of a chamber 10. The chamber 10 includes an upper chamber 26 opposing and affixed to a lower chamber 28. The upper chamber 26 includes a waste opening 30. The lower chamber 28 includes a filter cavity 56 suitable for housing a filter 58. A filter cap 60 retains the filter 58 within the filter cavity 56.

FIG. 21 illustrates a filtering system 110. The filtering system 110 may be a passive system (e.g., absorbs odors from ambient air). The filtering system 110 may include a filter 58. The filter 58 has an arcuate contour reciprocal with a contour of a chamber 10 (such as illustrated in FIG. 20). The filter 58 may include one or more physical filters 122 (not shown). For example, the physical filter 122 may include zeolite, charcoal, nylon, wool, synthetic wool, silica gel, baking soda, the like, or a combination thereof.

FIG. 22 illustrates a device 1 having a filtering system 110. The filtering system 110 is integrated into the chamber 10. The filtering system 110 resides adjacent to the waste bin 80. The filtering system 110 may be able to absorb odors and filter air which rise from waste located within a waste bin 80. The filtering system 110 may include one or more physical filters 122. The filtering system 110 may be the filtering system 110 described with respect to FIGS. 20 and 21.

FIGS. 23-25 illustrate an automated litter device 1. The litter device 1 includes a chamber 10, base 12, and litter dispenser 200. The litter dispenser 200 is affixed to the chamber 10. The litter dispenser 200 is affixed to a bonnet 14. The litter dispenser 200 is located opposite the opening 22 of the chamber 10.

Figures 26, 27, 28:
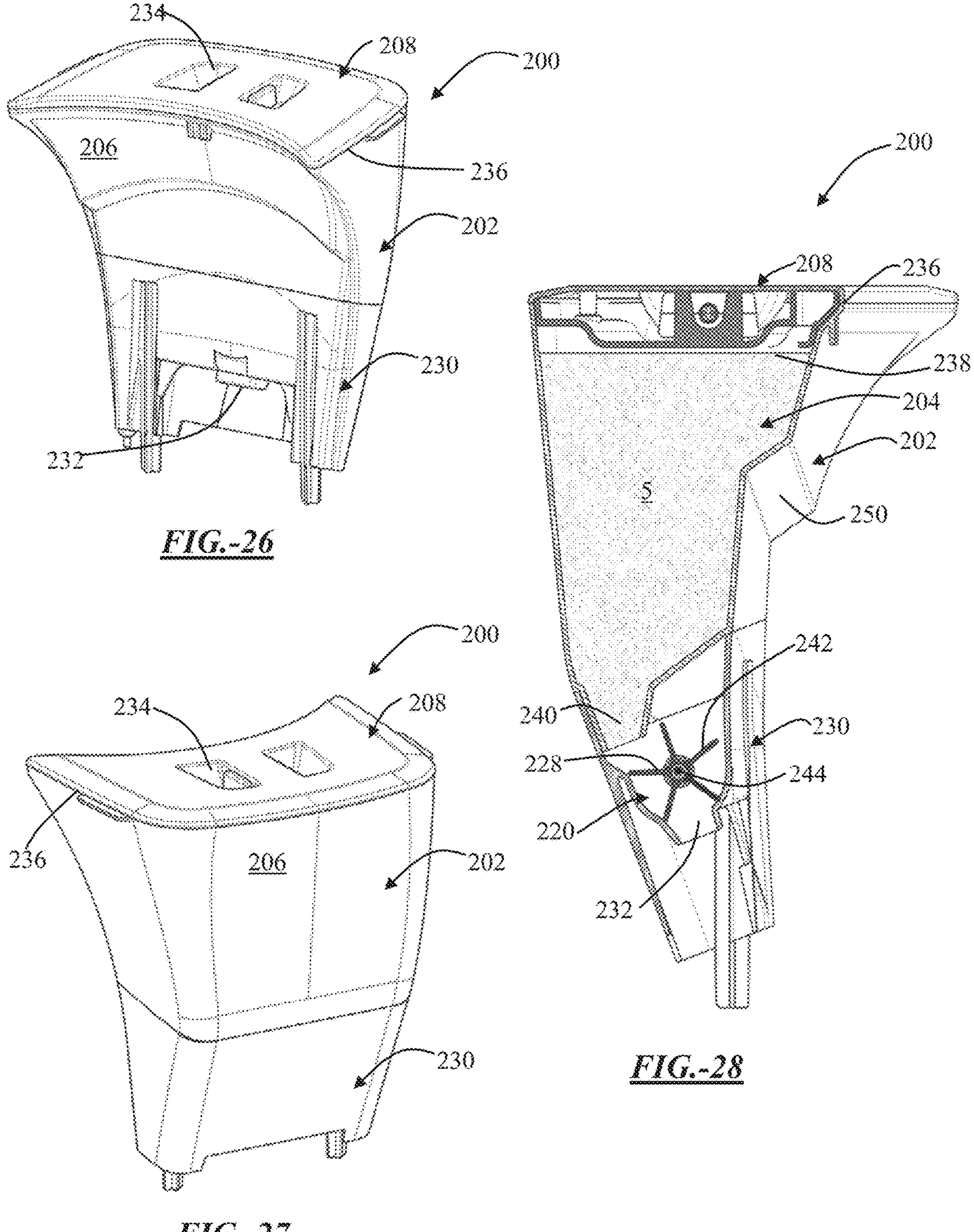
FIG. 26 is a front perspective view of a litter dispenser according to the teachings herein.
FIG. 27 is a rear perspective view of a litter dispenser according to the teachings herein.
FIG. 28 illustrates a cross-section of a litter dispenser along section C-C of FIG. 25 according to the teachings herein.

FIGS. 26 and 27 illustrate a litter dispenser 200. The litter dispenser 200 includes a lid 208, hopper 202, and dispenser housing 230. The lid 208 includes a handle 234 formed therein. The lid 208 rests partially within a rim 236 of the hopper 202. The hopper 202 includes hopper walls 206. The hopper wall 206 adapted to face toward the chamber 10 (such as shown in FIGS. 23-25) and bonnet 14 (not shown). The hopper wall 206 has a shape substantially reciprocal with the exterior of the chamber 10, more specifically the exterior of the bonnet 14. Adjacent and in communication with the hopper 202 is a dispenser housing 230. The dispenser housing 230 includes an opening 232.

FIG. 28 illustrates a cross-section of a litter dispenser 200 along line C-C from FIG. 25. The litter dispenser 200 includes a lid 208. The lid 208 rests partially within a hopper 202. The lid 208 rests within the rim 236 of the hopper 202. The hopper 202 stores litter 5 within a hollow interior 204. The volume of litter 5 able to be stored within the hopper 202 is limited by the lid 208. A fill line 238 indicates an acceptable volume of litter 5. The fill line 238 is located below the lid 208 such that the lid 208 is able to fully seat and engage with the hopper 202. The hopper 202 includes a funnel opening 240. The funnel opening 240 is located opposite of the lid 208. The funnel opening 240 allows for the hopper 202 to be in fluid communication with a dispenser housing 230. Located within the dispenser housing 230 is a dispensing device 220. The dispensing device 220 includes a paddle 228. The paddle 228 includes a plurality of fins 242 about a rotational shaft 244. The dispenser housing 230 includes an opening 232. The opening 232 allow for litter 5 to exit and be dispensed into a chamber 10 (not shown).

Figure 29:
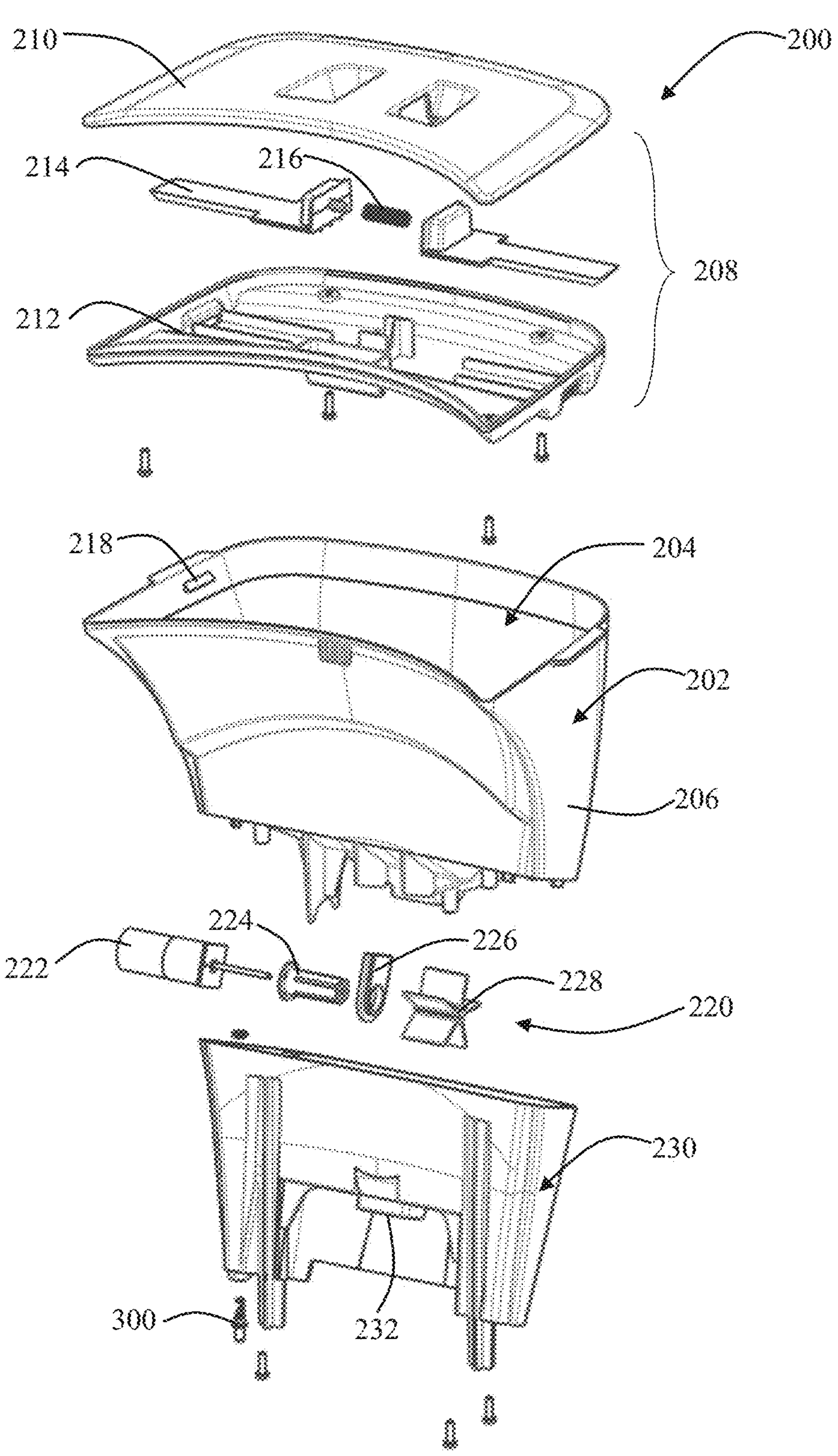
FIG. 29 is an exploded view of a litter dispenser according to the teachings herein.

FIG. 29 is an exploded view of a litter dispenser 200. The litter dispenser 200 includes a hopper 202. The hopper 202 may be useful for storing litter 5 (not shown) before dispensing into the chamber 10 (not shown). The hopper 202 includes a hollow interior 204 formed by the hopper walls 206. Useful for closing the hopper 202 is a lid 208. The lid 208 includes an outer lid 210 and inner lid 212. The lid 208 includes a lid latch 214 with a spring 216. The lid latch 214 engages with the hopper 202 to secure the lid 208 thereon. The lid latch 214 engages with the latch retainers 218. The latch retainers 218 are formed as part of the hopper walls 206 and face toward the hollow interior 204. The litter dispenser 200 includes a dispensing device 220. The dispensing device 220 includes a motor 222, hub 224, insert 226, and paddle 228. The dispensing device 220 is located within a dispenser housing 230. The dispenser housing 230 includes a dispensing opening 232. The litter dispenser 200 also includes an electrical connector 300. The electrical connector 300 allows for electrical current to be transmitted to the motor 222.

Figures 30, 31:
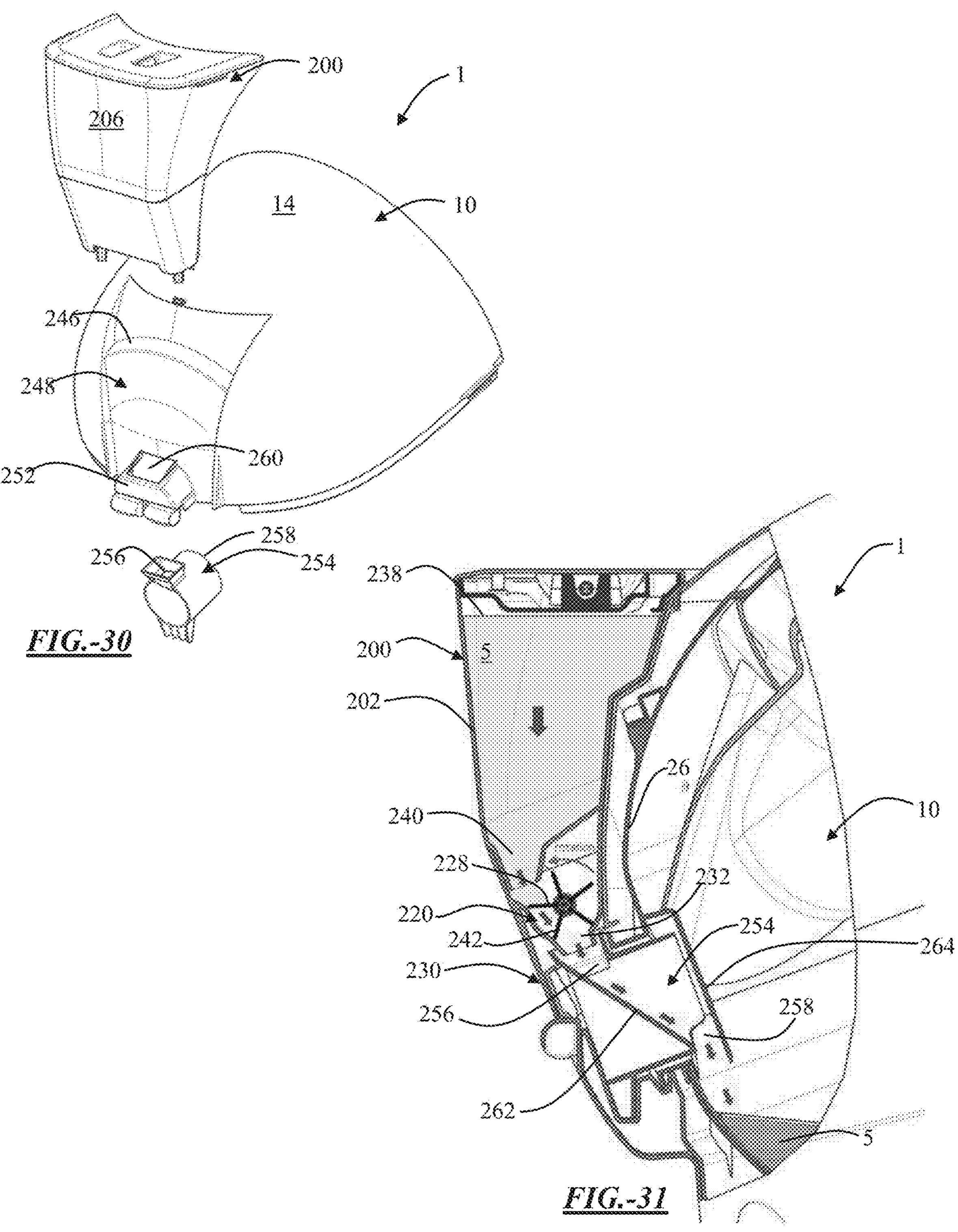
FIG. 30 illustrates a litter dispenser and bonnet of an automatic litter device according to the teachings herein.
FIG. 31 illustrates a dispensing process of litter according to the teachings herein.

FIG. 30 illustrates a partially exploded view of a portion of a litter device 1. The litter device 1 includes a bonnet 14. The bonnet 14 includes a dispenser pocket 248 formed therein. The dispenser pocket 248 is located generally opposite a chamber opening 22 (not shown). The dispenser pocket 248 is substantially reciprocal with a hopper wall 206. The chamber pocket 248 includes a lip 246. The lip 246 is generally reciprocal to a wall offset 250 (as shown in FIG. 29) of hopper 202. The chamber pocket 248 includes a chute casing 252. The chute casing 252 includes an opening 260. The opening 260 aligns with a chute 254 and the dispensing opening 232 (not shown) so litter 5 may transfer from a dispenser housing 230 (not shown) to a chute 254. A chute 254 is located within the chute casing 252. The chute 254 includes a chute inlet 256 and a chute outlet 258. Located within the chute 254 is the chute slide 262 (not shown).

FIG. 31 illustrates transfer of litter 5 from a litter dispenser 200 into a chamber 10 of a litter device 1. The litter 5 may initially be stored within the hopper 202 up to a fill line 238. The hopper 202 is located above a dispensing device 220. Gravity may be able to provide a constant supply of litter 5 to the dispensing device 220. A hopper 202 is in fluid communication with a dispenser housing 230 and dispensing device 220 via funnel opening 240. The funnel opening 240 may allow litter 5 to transfer from the hopper 202 to the dispenser housing 230. The litter 5 may be dispensed onto and/or in between fins 242. A certain level of litter 5 located within the chamber 10 may trigger transition of litter 5 from the litter dispenser 200 into the chamber 10. For example, one or more sensors 52 (not shown) may sense and/or measure a level of litter 5 within the chamber. During a cleaning cycle dispensing is triggered. A motor 222 (FIG. 28) may be initiated. The motor 222 may rotate a paddle 228. The motor 222 may rotate the paddle 228 through a hub 224. Rotation of the paddle 228 allows for litter 5 located between fins 244 to be in communication and pass through an opening 232 of a dispenser housing 230. Upon exiting the dispenser housing 230, litter 5 passes through a chute inlet 256 of a chute 254. Upon entering the chute 254, the litter 5 is conveyed via a chute slide 262 to a chute outlet 258. The chute outlet 258 is the gap between the chute slide 262 and the limiting wall 264. The limiting wall 264 is part of the upper chamber 26. Upon exiting the chute outlet 258, the litter 5 is located within the chamber 10.

Figures 32, 33, 34, 35:
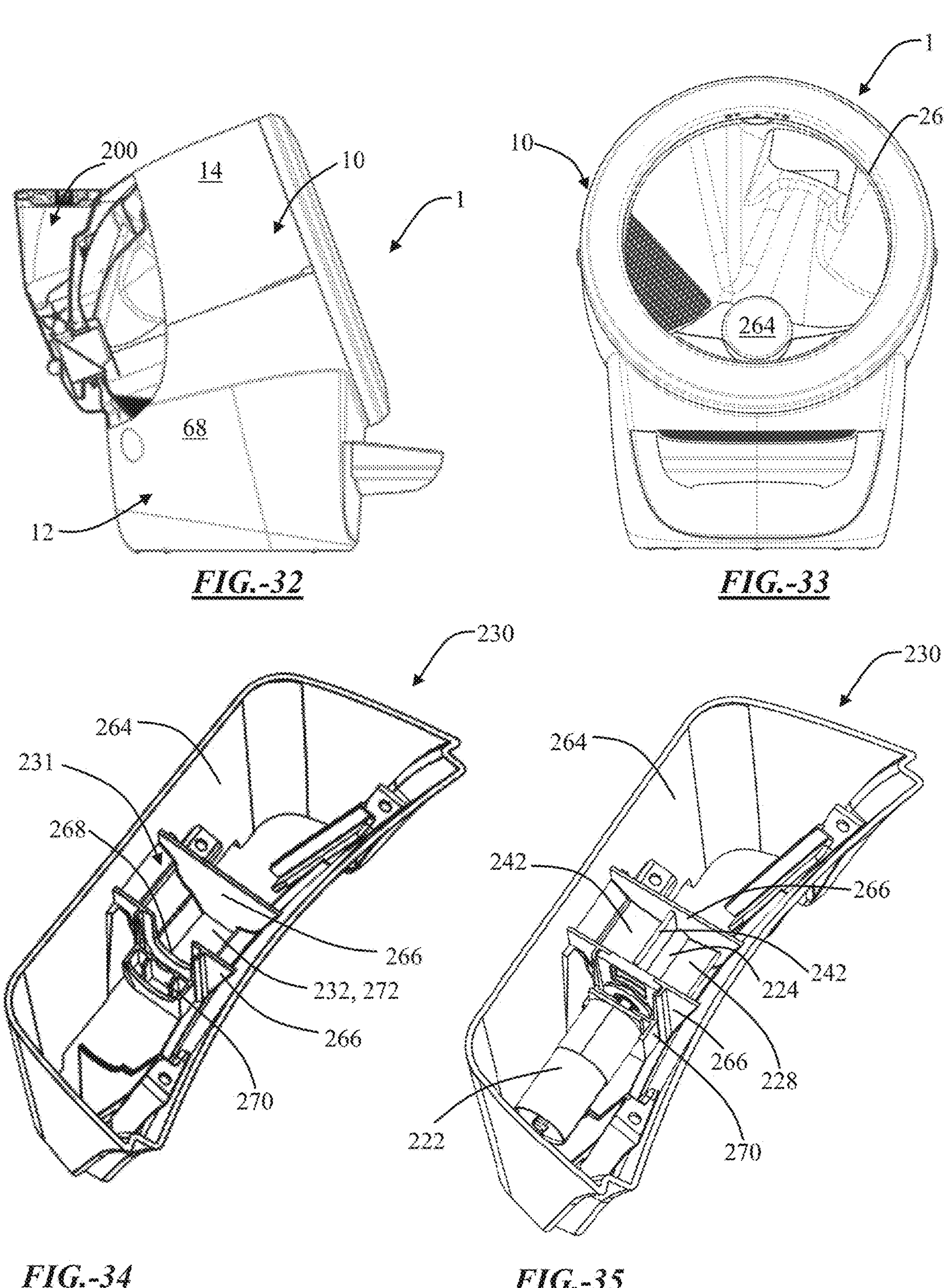
FIG. 32 is a left side view of an automatic litter device with a partial cross-section along section C-C of FIG. 25 according to the teachings herein.
FIG. 33 is a front view of an automatic litter device according to the teachings herein.
FIG. 34 is a perspective view into an interior of a dispenser housing according to the teachings herein.
FIG. 35 is a perspective view into an interior of a dispenser housing retaining a dispensing device according to the teachings herein.

FIG. 32 illustrates a partial cross-section of a litter device 1 along section C-C of FIG. 25. The litter device 1 includes a litter dispenser 200 affixed to both a bonnet 14 and base frame 68.

FIG. 33 is a front view of an automatic litter device 1. Within the interior of the chamber 10 is a limiting wall 264. The limiting wall 264 is formed as part of the upper chamber 26. The limiting wall 264 is distanced from and cooperates with the chute slide 262 (such as shown in FIG. 31) to form the chute outlet 258 (such as shown in FIG. 31).

FIG. 34 illustrates an interior of a dispenser housing 230. The dispenser housing 230 includes a dispenser mount 231. The dispenser housing 230 includes a hollow interior formed by side walls 264. Within the hollow interior there are two mounting walls 266. The two mounting walls 266 are opposing and distanced from one another. The two mounting walls 266 extend from one side wall 264 to an opposing side wall 264. One mounting wall 266 includes an opening 268. Adjacent to a mounting wall 266 is a cradle 270. The mounting walls 266 cooperate with the side walls 264 to form a dispensing outlet 272. The dispensing outlet 272 is hollow and forms a dispensing opening 232. The two mounting walls 266 and cradle 270 form the dispenser mount 231.

FIG. 35 illustrates a dispensing device 220 retained in place by a dispenser mount 231. A motor 222 is held in place by a cradle 270. The motor 222 is in rotational communication with a paddle 228. The paddle 228 may include a plurality of fins 242. The fins 242 may be affixed to a hub 224. The paddle 228 and the hub 224 may be held in place by mounting walls 266. The paddle 228 and hub 224 may extend from one mounting wall 266 to an opposing mounting wall 266. The paddle 228 and the hub 224 may be located adjacent to and/or above a dispensing outlet 272, as shown in FIG. 34.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of “about” or “approximately” in connection with a range applies to both ends of the range. Thus, “about 20 to 30” is intended to cover “about 20 to about 30”, inclusive of at least the specified endpoints.

The terms “generally” or “substantially” to describe angular measurements may mean about +/−10° or less, about +/−5° or less, or even about +/−1° or less. The terms “generally” or “substantially” to describe angular measurements may mean about +/−0.01° or greater, about +/−0.1° or greater, or even about +/−0.5° or greater. The terms “generally” or “substantially” to describe linear measurements, percentages, or ratios may mean about +/−10% or less, about +/−5% or less, or even about +/−1% or less. The terms “generally” or “substantially” to describe linear measurements, percentages, or ratios may mean about +/−0.01% or greater, about +/−0.1% or greater, or even about +/−0.5% or greater.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An automated litter device having:

a) a chamber configured for retaining a litter and configured to rotate during a cleaning cycle, wherein the chamber includes:
   i) an entry opening so that an animal can enter and exit the chamber; and
   ii) a waste opening configured so that waste of the animal passes through the waste opening upon rotation of the chamber; and b) one or more sensors located adjacent to the entry opening, such as to be disposed at a periphery of the entry opening, and wherein the one or more sensors are adapted to sense an entry of the animal into the chamber, an exit of the animal from the chamber, a presence of the animal within the chamber, a presence of the waste, a level of the litter in the chamber, a position of the chamber, or any combination thereof.

2. The automated litter device of claim 1, wherein the one or more sensors are able to sense presence, measure a distance, measure a displacement, detect a position relative to one or more components of the automated litter device, or any combination thereof.

3. The automated litter device of claim 1, wherein the one or more sensors include one or more infrared sensors, laser sensors, ultrasonic sensors, radio frequency (RF) admittance sensors, conductive sensors, optical interface sensors, microwave sensors, or a combination thereof.

4. The automated litter device of claim 3, wherein the one or more sensors include the one or more laser sensors.

5. The automated litter device of claim 1, wherein the one or more sensors are a plurality of sensors.

6. The automated litter device of claim 1, wherein the automated litter device includes a bezel about the entry opening.

7. The automated litter device of claim 6, wherein the one or more sensors are assembled to the bezel.

8. The automated litter device of claim 7, wherein the one or more sensors are located on the bezel to have a line of sight into the chamber, the waste opening, or both when aligned with a waste drawer.

9. The automated litter device of claim 1, wherein at least one of the one or more sensors has a line of sight onto a majority of an exposed surface of the litter so as to detect the presence of the animal within the chamber, the level of the litter in the chamber, or both.

10. The automated litter device of claim 1, wherein during the cleaning cycle, the chamber is configured to rotate such that the waste transfers from the chamber into a waste receptacle outside of the chamber.

11. The automated litter device of claim 10, wherein the automated litter device includes a base which rotatably supports the chamber.

12. The automated litter device of claim 11, wherein the waste receptacle is supported by the base.

13. The automated litter device of claim 7, wherein the automated litter device includes a bonnet which at least partially covers the chamber and the bezel is affixed to the bonnet.

14. The automated litter device of claim 13, wherein the automated litter device includes a base; and the base has the bonnet affixed thereto.

15. The automated litter device of claim 14, wherein the bezel is affixed to the base.

16. The automated litter device of claim 1, wherein the one or more sensors are adapted to sense the entry of the animal into the chamber, the exit of the animal from the chamber, the presence of the animal within the chamber, or any combination thereof.

17. An automated litter device having:

a) a base supporting a waste receptacle;

b) a chamber configured for retaining a litter, rotatably supported by the base, and configured to rotate during a cleaning cycle, wherein the chamber includes:
   i) an entry opening so that an animal can enter and exit the chamber; and c) one or more sensors located adjacent to the entry opening such as to be disposed at a periphery of the entry opening, and wherein the one or more sensors are adapted to sense an entry of the animal into the chamber, an exit of the animal from the chamber, a presence of the animal within the chamber, or any combination thereof.

18. The automated litter device of claim 17, wherein the one or more sensors include one or more infrared sensors, laser sensors, ultrasonic sensors, radio frequency (RF) admittance sensors, conductive sensors, optical interface sensors, microwave sensors, or a combination thereof.

19. The automated litter device of claim 17, wherein the one or more sensors are affixed to the chamber, a bezel, a bonnet, or any combination thereof.

20. The automated litter device of claim 17, wherein the automated litter device includes a bezel about the entry opening and statically affixed to one or more components which house and/or support the chamber; and wherein the one or more sensors are assembled to the bezel such as to be adjacent to the entry opening.

* * * * *